United States Patent
Sarukkai et al.

(10) Patent No.: US 8,010,991 B2
(45) Date of Patent: Aug. 30, 2011

(54) POLICY RESOLUTION IN AN ENTITLEMENT MANAGEMENT SYSTEM

(75) Inventors: Sekhar Sarukkai, Sunnyvale, CA (US); Rajiv Gupta, Los Altos, CA (US); Raghavendra Prasad, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 891 days.

(21) Appl. No.: 12/018,103

(22) Filed: Jan. 22, 2008

(65) Prior Publication Data

US 2008/0184336 A1 Jul. 31, 2008

Related U.S. Application Data

(60) Provisional application No. 60/897,885, filed on Jan. 29, 2007, provisional application No. 60/897,886, filed on Jan. 29, 2007, provisional application No. 60/897,887, filed on Jan. 29, 2007, provisional application No. 60/897,888, filed on Jan. 29, 2007, provisional application No. 60/897,889, filed on Jan. 29, 2007.

(51) Int. Cl.
*H04L 29/06* (2006.01)
*G06F 17/30* (2006.01)
(52) U.S. Cl. .............................................. 726/1; 726/2
(58) Field of Classification Search ........................ None
See application file for complete search history.

(56) References Cited

U.S. PATENT DOCUMENTS

| | | | |
|---|---|---|---|
| 6,460,141 B1 * | 10/2002 | Olden | 726/4 |
| 7,117,195 B2 * | 10/2006 | Chantrain et al. | 709/221 |
| 7,921,452 B2 * | 4/2011 | Ridlon et al. | 726/1 |
| 2005/0166260 A1 * | 7/2005 | Betts et al. | 726/4 |
| 2008/0086473 A1 | 4/2008 | Searl | |
| 2008/0184336 A1 | 7/2008 | Sarukkai | |

OTHER PUBLICATIONS

Ardanga et al., "A Web Service Architecture for Enforcing Access Control Policies", Electronic Notes in Theoretical Computer Science, 2005, Elsevier, pp. 47-62.*

(Continued)

*Primary Examiner* — Kambiz Zand
*Assistant Examiner* — William S Powers
(74) *Attorney, Agent, or Firm* — Hickman Palermo Truong & Becker LLP

(57) ABSTRACT

An externalized entitlement management system comprises a policy administration point that is configured to receive one or more definitions or updates of entitlement policies specifying subjects, actions, and resources, and to update a first entitlement repository coupled to the policy administration point with the definitions or updates in response to receiving the definitions or updates; one or more policy decision points that are coupled to the policy administration point over a network; one or more policy enforcement points that are integrated into one or more respective first application programs, wherein each of the policy enforcement points is coupled to one of the policy decision points; and one or more action handlers in the policy administration point, wherein each of the action handlers is configured to intercept a particular action represented in an update to an entitlement policy, to transform the action into an entitlement update in a form compatible with a native entitlement mechanism of a second application program that does not have one of the policy enforcement points, to send the transformed entitlement update to the second application program, and to cause a rollback of the update of the first entitlement repository if the second application program fails to implement the entitlement update in the native entitlement mechanism.

26 Claims, 17 Drawing Sheets

OTHER PUBLICATIONS

Seitz et al., "Policy Administration Control and Delegation using XACML and Delegent", Grid Computing Workshop 2005, 2005, IEEE, pp. 49-54.*

Securent Entitlement Management Solution. Concepts Guide. Published by Securent, Aug. 2007. [Retrieved on Sep. 23, 2008]. pp. 1-23. Retrieved from Securent, Part No. 31-CONC-01.

Geer, D. Entitlement Management as a Security Measure. Processor Editorial Article [online]. Published by Processor, pp. 1-3. Dec. 2007 [retrieved on Sep. 23, 2008]. Retrieved from the Internet:<URL:http://www.processor.com/editorial/article.asp?article=articles%2Fp2952%2F33p52%2F33p52.asp>. vol. 29, issue 52. Lincoln, Nebraska, USA.

Crosslogix. Enterprise Entitlement Management: An Overview [online]. Published by CrossLogix. pp. 1-13. Dec. 2001 [retrieved on Sep. 23, 2008]. Retrieved from the Internet:<URL: http://www.rethought.net/documents/crosslogix/Enterprise_Entitlementfinal.pdf>. Redwood Shores, California, USA.

* cited by examiner

| Task / Role | Add | View | Search | Analyze | Trade | View All | Admin Tasks | Escalate To |
|---|---|---|---|---|---|---|---|---|
| Member | ✓ | ✓ | | | | | | |
| Owner | | ✓ | ✓ | ✓ | | | | |
| Submitter | ✓ | | | | | | | |
| Trader | | | | | ✓ | | | ✓ |
| Admin | | | | | | | ✓ | |
| Super User | | ✓ | | | | ✓ | | |

*FIG. 14*

POLICY RESOLUTION IN AN ENTITLEMENT MANAGEMENT SYSTEM

CROSS-REFERENCE TO RELATED APPLICATIONS; PRIORITY CLAIM

This application claims the benefit of and priority to provisional application 60/897,885, filed Jan. 29, 2007, provisional application 60/897,886, filed Jan. 29, 2007, provisional application 60/897,887, filed Jan. 29, 2007, provisional application 60/897,888, filed Jan. 29, 2007, and provisional application 60/897,889, filed Jan. 29, 2007, the entire contents of which are hereby incorporated by reference as if fully set forth herein, under 35 U.S.C. §119(e).

TECHNICAL FIELD

The present disclosure generally relates to data processing. The disclosure relates more specifically to policy-based management of access by application programs to networked computer resources.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Entitlement management refers to determining which users, applications, or other entities are entitled to access a particular application program, server or other resource in a network. In past approaches, entitlement management for application programs and application servers generally has been implemented within a particular application program, and the entitlement management logic of one application has been inaccessible to, or incompatible with, other applications. For example, the user authentication logic of an Oracle RDBMS system is normally inaccessible to the user authentication logic of a Microsoft Exchange Server program. Further, user authentication systems that are used to control admission of a user to a protected network are normally inaccessible to the application servers.

BRIEF DESCRIPTION OF THE DRAWINGS

In the drawings:

FIG. 14 is an example of an access control matrix.

DETAILED DESCRIPTION

Figure 1:
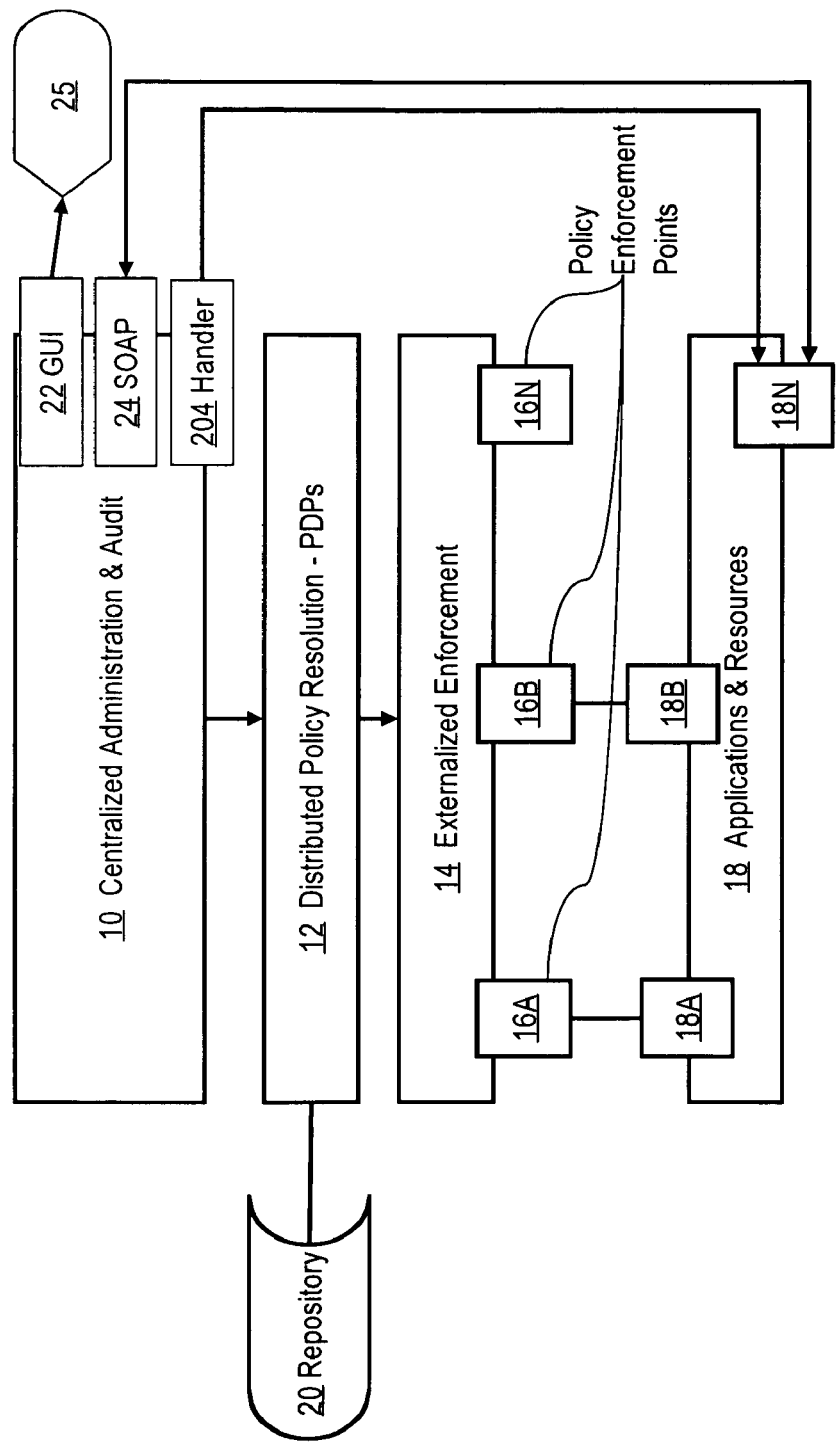
FIG. 1 illustrates an entitlement management system.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

1.0 General Overview

An externalized entitlement management system comprises a policy administration point that is configured to receive one or more definitions or updates of entitlement policies specifying subjects, actions, and resources, and to update a first entitlement repository coupled to the policy administration point with the definitions or updates in response to receiving the definitions or updates; one or more policy decision points that are coupled to the policy administration point over a network; one or more policy enforcement points that are integrated into one or more respective first application programs, wherein each of the policy enforcement points is coupled to one of the policy decision points; and one or more action handlers in the policy administration point, wherein each of the action handlers is configured to intercept a particular action represented in an update to an entitlement policy, to transform the action into an entitlement update in a form compatible with a native entitlement mechanism of a second application program that does not have one of the policy enforcement points, to send the transformed entitlement update to the second application program, and to cause a rollback of the update of the first entitlement repository if the second application program fails to implement the entitlement update in the native entitlement mechanism.

In an embodiment, the policy administration point is further configured to provide the action represented in an update to one or more of the policy decision points, and each of the policy decision points is configured to perform policy resolution based on the action and to transform the action into enforcement data that the policy enforcement points can use to enforce the entitlement policy in the first application programs.

In an embodiment, one of the policy decision points and an associated one of the policy enforcement points is configured within a server process of an application server of one of the first application programs. In an embodiment, one of the policy decision points is configured outside a server process of an application server of one of the first application programs and an associated one of the policy enforcement points is configured within the server process.

In an embodiment, a first one of the policy decision points and the policy administration point are coupled to the first entitlement repository, and a second one of the policy decision points and the policy administration point are coupled to a second entitlement repository.

In an embodiment, the action handlers are coupled using a messaging infrastructure to one of the policy decision points, and that one of the policy decision points is coupled to a second entitlement repository. In an embodiment, one or more of the policy decision points comprises a PDP decision cache that stores policy resolution decisions, and the PDP decision cache is coupled to a PEP decision cache at one of the policy enforcement points.

In an embodiment, one or more of the policy enforcement points comprises an administrative interface that is configured to issue one or more administrative calls to the policy administration point and a decision interface that is configured to issue one or more decision queries to an associated one or the policy decision points. In an embodiment, the policy administration point is further configured to receive the one or more definitions or updates of entitlement policies in an XACML file received on a SOAP interface of the policy administration point.

In other embodiments, the invention encompasses a computer-readable medium carrying instructions configured to carry out certain functional steps and a computer-implemented method that can provide hybrid policy resolution for custom and commercial off-the-shelf applications.

2.0 Structural and Functional Overview 2.1 Entitlement Management System-Overview FIG. 1 illustrates an entitlement management system. In an embodiment, the system comprises a centralized administration and audit layer 10, a distributed policy resolution layer 12, an externalized enforcement layer 14, an applications and resources layer 18, and one or more data repositories 20. The externalized enforcement layer 14 comprises one or more policy enforcement points 16A, 16B, 16N that may be configured within a particular application 18A, 18B or external to an application. For example, policy enforcement points may be linked into a corresponding or may execute as an agent separate from the application. As a result, entitlement policies may be centrally defined and normalized yet deployed to diverse applications either using the native entitlement sub-system of the application or using an external agent. In this configuration, the system is scalable, appropriate for use in large business enterprises, and capable of configuration to achieve fine-grained distributed entitlement management, resolution, enforcement, and auditing.

In an embodiment, the centralized administration and audit layer 10 is implemented as a Policy Administration Point (PAP) in software hosted on a general-purpose computer system and is configured to provide centralized administration, management and monitoring of entitlement policies, with delegation and integration with the repository 20. The PAP enables disparate or centralized teams of people to write policies and access auditing and reporting functions.

In an embodiment, the distributed policy resolution layer 12 is implemented as one or more high-speed, centralized and/or distributed Policy Decision Points (PDPs) that are configured to provide evaluation of application-specific and enterprise authorization policies. The PDP is configured to connect to existing policy information points (PIPs) or repositories such as LDAP servers or databases of a particular enterprise or facility. The policy enforcement points (PEPs) 16A, 16B, 16N in the externalized enforcement layer 14 are configured to enforce entitlement policy decisions made by the PDP for applications, frameworks, or resources, and the policy enforcement points may be pre-built or customized to a particular application.

As indicated in FIG. 1, in an embodiment a three-tier logical architecture is provided consisting of a PAP, PDP, and PEP. Each layer of the architecture may be implemented in different network elements in various embodiments or deployments. For example, the PEP may be placed in any physical tier or network tier of an IT system to enforce entitlements for applications or application components running in those tiers. The PDP can be placed in any tier to resolve entitlements for the applications or application components running in those tiers. Typically, the PDP is placed in a separate network tier to enhance security, unless a local or in-process PDP is appropriate for performance reasons or other reasons. The use of in-process PDPs is described further herein in a separate section.

The PAP is usually organized in the application tier and may be implemented, for example, as a J2EE web application. In such an embodiment, a web server serves HTML documents for the PAP and acts as a presentation tier, a J2EE application server runs the PAP application, and the entitlement repository may be viewed as present in a data tier. The PAP also may be hosted within custom applications that may run in other tiers.

Referring again to FIG. 1, embodiments can be used for custom application programs 18N that are implemented, for example, in Java, .NET or COM. In such embodiments, the PAP models policies that are stored in the repository 20. Policy updates are communicated by the PAP to the appropriate PDP. The PDP uses the updated policies at runtime to determine authorization decisions. The PEP, implemented in Java, .NET or COM, as appropriate, intercepts application requests and queries the PDP for policy decisions. No authorization-related logic is implemented within the application program. Policies may be maintained either using a graphical user interface 22 delivered by the PAP for display to a display 25, or by integrating functions of the PAP into the custom applications using a SOAP interface 24 to the PAP.

Figure 2A:
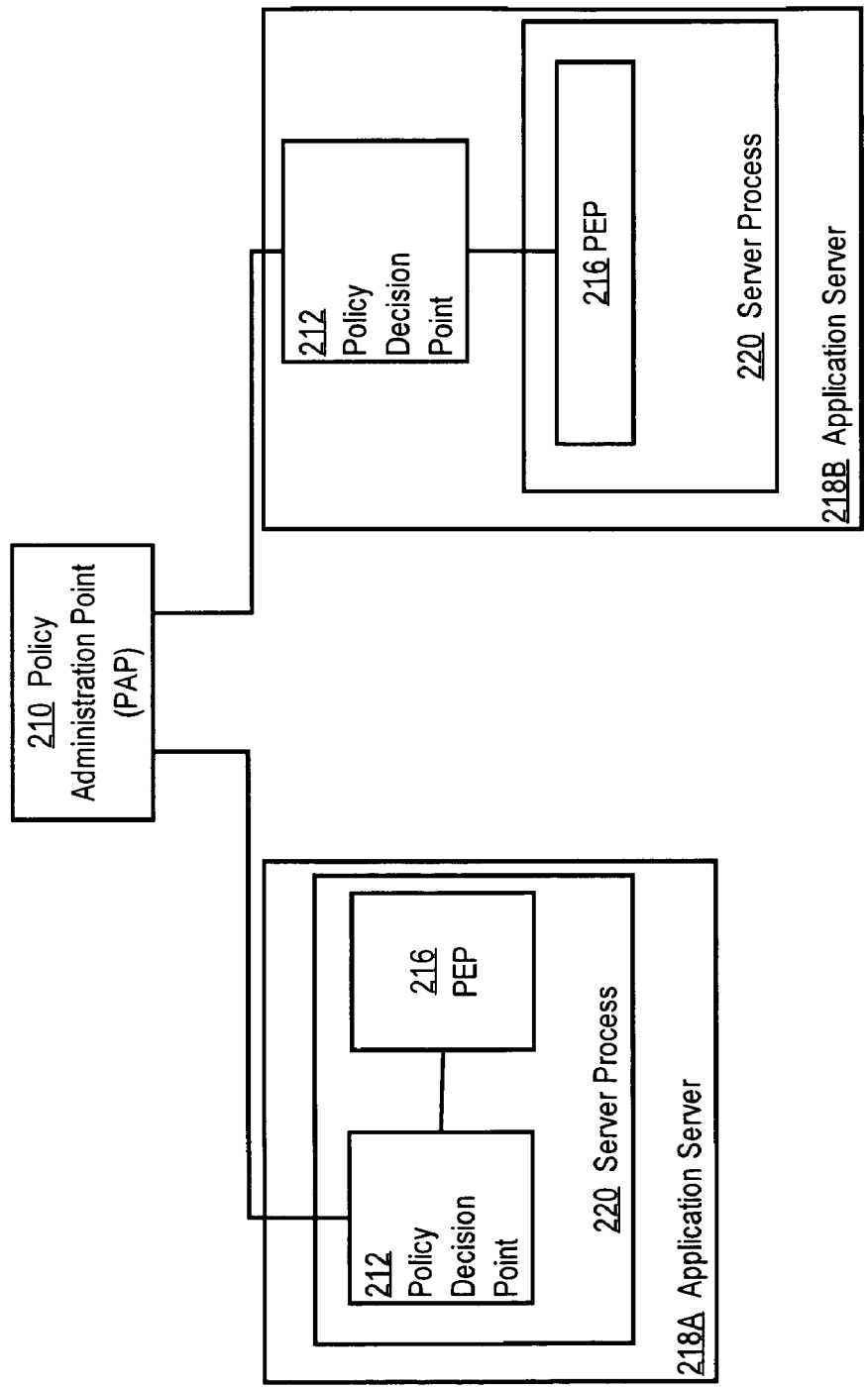
FIG. 2A illustrates logical structure for policy decision points to run in-process or out-of-process.

In some embodiments, applications 18A, 18B are commercial off-the-shelf (COTS) application programs. Applications 18A, 18B may already have an entitlement sub-system built into the application. In such an environment, externalized enforcement layer 14 performs administration of entitlements, providing greater control and visibility for administrators to author and change policies in real time, while at the same time enhancing auditing and compliance capabilities. In such an embodiment, all policy changes are updated from the PAP in native form to the applications 18A, 18B so that the applications can continue to use native security mechanisms at runtime. In an embodiment, policy enforcement points 16A, 16B comprise policy-event handlers 204 (FIG. 1, FIG. 2A) that are configured for compatibility with a particular application 18A, 18B. Each policy handler 204 converts one or more policy administration events to application-specific programmatic calls or database entries that result in user, group or role-based access control list (ACL) changes or ACL rules.

In such an embodiment, the repository 20 acts as a central, authoritative repository of entitlement policies that can be queried against for audit or review. Further, policy lifecycle can be managed using centralized administration and audit layer 10. Consequently, a manager is not required to interact directly with the security mechanisms or entitlement systems that are integrated into applications 18A, 18B. Instead, a single point of control is provided in layer 10, which can indirectly affect operation of entitlements for many different application programs.

Additionally or alternatively to the externalized entitlement approach for COTS applications, policy enforcement points 16A, 16B, 16N may be directly integrated into an application 18A, 18B. Therefore, the entitlement system herein can be simultaneously applied to both custom applications that are protected by PDPs and PEPs within the applications, and applications that rely on native security mechanisms.

In an embodiment, such a simultaneous approach is supported by the following logical elements:

1. A metadata model that captures the relationship between applications or resources and a PDP.

2. Logic in the administration and audit layer 10 that implements all entitlement policy changes using virtualized PDP identifiers. For example, policy entities such as subjects, resources, and attributes may be used for policy authoring. Therefore, PDPs can be migrated from one data model to another over time without changing policies. For example, a move from a legacy application entitlement engine to an integrated PDP does not require changes in policies.

3. Logic providing the capability to add multiple custom adapters to write out policies in native format using APIs, database access, or other methods, simultaneously. Thus, policy changes may be captured using an interception callout in the PAP that is configured to talk to one or more external policy handlers 204 over any protocol.

4. Logic providing the capability to consistently author and review policies centrally using the PAP even if policies are enforced or resolved in native form at different PDPs for different applications.

In various embodiments, PDPs can execute outside an application program process in which the PEP executes and on the same server as the application logic, or on a separate server. PDPs also can be deployed as a library to run in-process with the application, along with the PEP.

FIG. 2 illustrates logical structure for PDPs to run in-process or out-of-process. A PAP 210 is coupled to application servers 218A, 218B. Application server 218A illustrates an in-process arrangement in which PEP 216 executes as part of PDP 212 within a server process 220 in which application logic 18A also executes. Application server 218B illustrates an out-of-process arrangement in which PEP 216 executes as part of PDP 212, but the PDP executes outside the server process 220 in a separate process on the application server. In the latter case the PDP 212 also could execute in a separate server rather than on server 218B.

In an embodiment, in the out-of-process case the PEP 216 interacts with PDP 212 using TCP-based communications, such as XACML or HTTP, while in the in-process case the PEPs use library function calls to the PDPs, which eliminates latency due to network delays. The PAP 210 can centrally manage policy lifecycle independent of the deployment model chosen for the PDPs. Both the in-process and out-of-process PDPs can use the same program code and perform similar functions.

In an embodiment, the out-of-process PDP is deployed as a WAR file in a servlet container and an in-process PDP may be deployed as a Java® archive (JAR) file along with the PEP jar. For .NET applications, the .NET PEP is implemented in the C# language, while the PDP can be deployed to run in the same CLR instance using a third-party .NET-Java bridge.

2.2 Extensible Mechanism for Policy Administration to Communicate Policy Changes to Multiple Policy Decision Engines In an embodiment, an entitlement service can be configured using a shared data access model or a shared-nothing (distributed) data access model. The entitlement service comprises one or more Policy Administration Point (PAP) network nodes and one or more Policy Decision Point (PDP) network nodes. Each network node may comprise a general-purpose computer or an element of network infrastructure such as a router or switch. The entitlement service may use both the shared access data model and the shared nothing data access model at the same time, including in a single enterprise-wide deployment of the entitlement service. Determining "entitlement," in this context, means determining or resolving which roles, associated with users, client computers, or client software elements, are entitled to access which applications, servers, or other networked resources.

In an embodiment, an Entitlement Domain comprises a view into an Entitlement Repository, which stores meta-data to administer entitlements for an application program, and metadata to support evaluation of policies and providing policy decisions. The Policy Administration Point (PAP) provides a view into the repository and is responsible for persistently storing the meta-data into the repository. A user can choose to work with one of the domains that are available from within the PAP.

Figure 3:
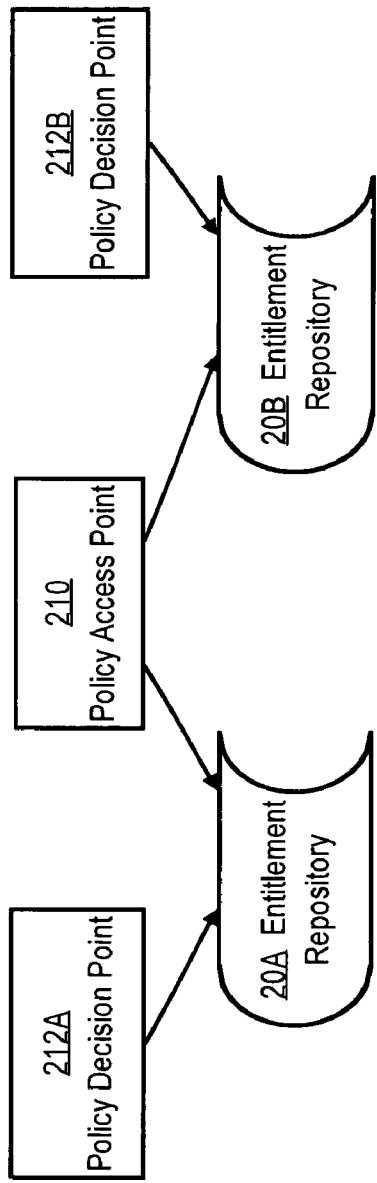
FIG. 3 illustrates a shared data access arrangement in an entitlement service.

FIG. 3 illustrates a shared data access arrangement in an entitlement service. In the shared data access model, both the PAP 210 and the PDP 212A share a common Entitlement Repository 20A. The Entitlement Repository 20A can be configured using two or more high-availability or clustered computers and data storage devices. The PAP 210 administers all the entitlements, which are persistently stored in the Entitlement Domain of the repository that is then currently being used. The PDP accesses the same repository to evaluate policies and to issue decisions to application programs. In the shared data access model, one instance of a PAP 210 may communicate with several Entitlement Repositories 20A, 20B. Each of the PDPs 212A, 212B communicates with only one entitlement repository 20A, 20B, respectively.

Figure 4:
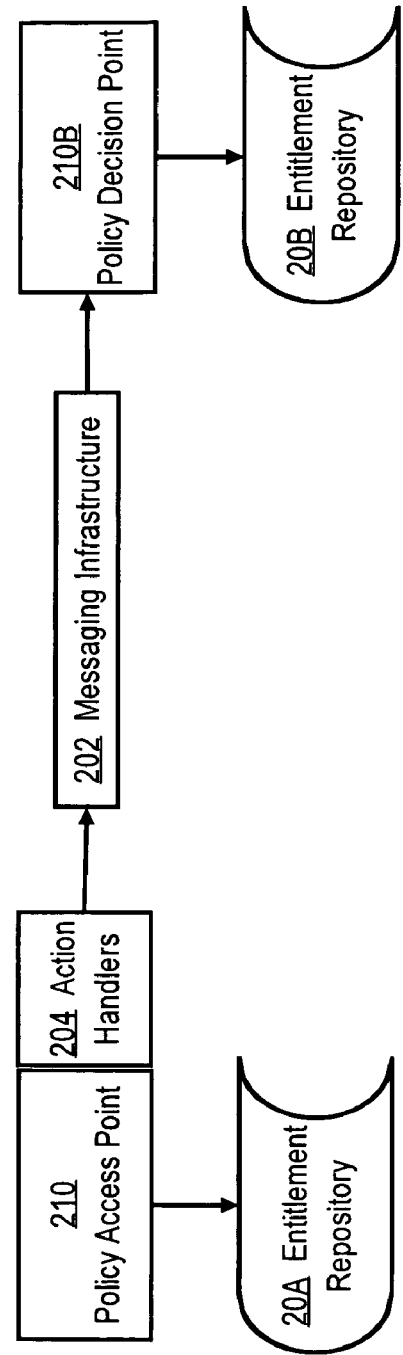
FIG. 4 illustrates a shared nothing data access arrangement in an entitlement service.

FIG. 4 illustrates a shared nothing data access arrangement in an entitlement service. In the shared nothing data access model, each of the PAP 210 and the PDP 212B has a separate Entitlement Repository 20A, 20B, respectively. The PAP 210 and PDP 212B communicate using a messaging infrastructure 202. Examples of messaging infrastructure 202 include TIBCO, MQ, etc. The PAP 214 comprises a plurality of action handlers 204 that publish each and every action in the PAP to a messaging server. Each time a user requests or performs a particular action at PAP 210, a corresponding handler 204 is invoked and sends an event to the messaging infrastructure 202. Examples of actions resulting in events include updating a policy in Entitlement Repository 20A, creating a new policy, etc. The PDP 212B acts a subscriber and consumes the messages received from the messaging infrastructure 202. The PDP 212B is also responsible for persisting the received data into its repository 20B.

In an embodiment, the Entitlement Authority or PAP 210 has its own repository 20A and changes to entitlement data are stored in this repository. Action handlers 204 may be configured to persistently store entitlement data in the repository 20A when actions occur. In an embodiment, a handler 204 does not store the entitlement data to the repository 20A if the messaging infrastructure 202 is not available. As a result, consistency between the Entitlement Repositories 20A, 20B is maintained.

Consistency between the entitlement repositories 20A, 20B is further accomplished by using a reliable message delivery service between the two repositories in the form of the messaging infrastructure 202. In an embodiment, PAP 210 comprises a synchronization module that is configured to synchronize the entitlement data between the two repositories. When synchronization needs to be done between the PAP repository 20A and the PDP repository 20B, the PAP 210 sends entitlement data to be synchronized to the PDP repository 20B over messaging infrastructure 202.

Reliable delivery is achieved by configuring the messaging infrastructure 202 to persistently store messages that it receives. For this purpose, messaging infrastructure 202 may comprise one or more messaging servers and one or more storage units. Although the messaging infrastructure 202 guarantees delivery without persistent storage, the messaging infrastructure can be configured to persistently store messages and forward the messages at a later time, so that reliable delivery can occur when the PDP 212B is down or unavailable, for example.

When the PDP 212B is available but the repository 20B is not available, the PDP is configured to send a message on messaging infrastructure 202 back to the PAP 210, which message requests the PAP to roll back the changes represented in a previously sent message. As a result, the entitlement repositories 20A, 20B are continually maintained in a consistent state.

2.3 Caching Configuration

Figure 5:
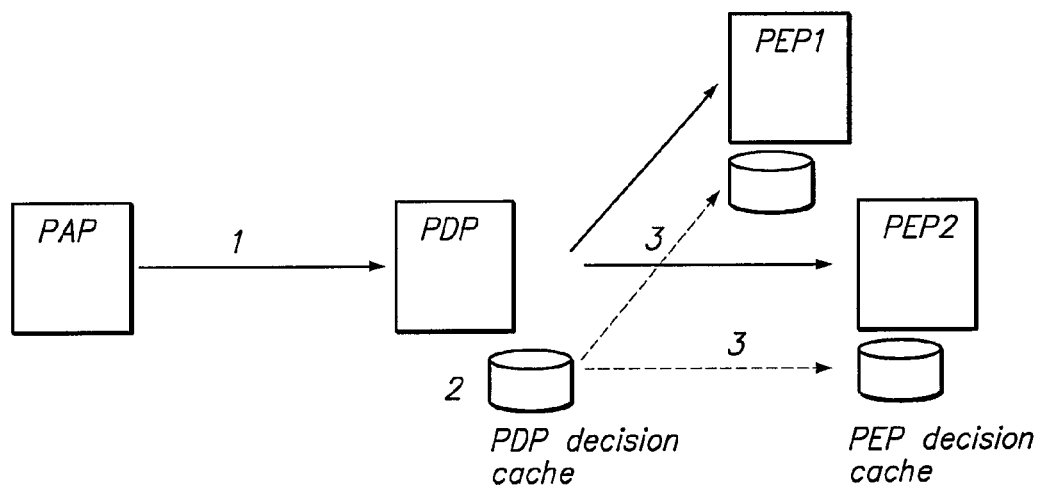
FIG. 5 illustrates operations in caching policy decisions.

FIG. 5 illustrates operations in caching policy decisions. In an embodiment, components of FIG. 1 comprise logic configured to provide caching, pre-fetching and policy propagation. In an embodiment, policy changes made using the PAP 210 are communicated to PDPs as shown in FIG. 5.

In an embodiment, a PDP tracks policy changes and periodically updates the PDP decision cache with re-evaluated policy decisions, as shown in step 2 of FIG. 5. The PDP decision cache contains the most recent, updated decisions for resources. The PDP decision cache acts as a master and policy changes are propagated to PEP caches using a reliable messaging infrastructure as shown in step 3 of FIG. 5. Examples of the messaging infrastructure include JMS and MQ. Alternatively, a pull-based model enables PEPs to periodically poll the PDP for any change in decisions. Any changes in decisions are then updated by the PEP in its local cache. Additionally, the PEP caches can be configured to persistently store policy decisions in a database or file system.

Using this approach, policy changes that are made in the PAP 210 result in near real-time updates to decision caches at the PEPs running with the applications in a reliable manner.

2.4 Failure Protection

The arrangement shown herein is configured to avoid a single point of failure. The PAP 210 is not involved in runtime decision-making and hence even if the PAP goes offline, run-time decisions can continue without impact. In an embodiment, if the Entitlement Repository 20 becomes unavailable, the PDP will continue to operate using policies obtained from the cache. The PDP cannot persistently store updated policies from the PAP until the Entitlement Repository 20 is online.

If the PDP becomes unavailable, the PEP fails over to another instance of the PDP over a wide area network, if available.

If none of the PDPs are reachable, the PEP can continue to work off of the decision cache that is local to the application. As soon as connectivity is established with the PDP, any updated policies since the last known time of connection with the PDP is communicated by the PDP to the PEP.

The PEP cache can also survive application recycles as the PEP cache can be configured to be persisted in a local data store.

Using logic configured as set forth above, any failure is effectively isolated and does not have system-wide effects that can result in disruption of application function.

Figure 6:
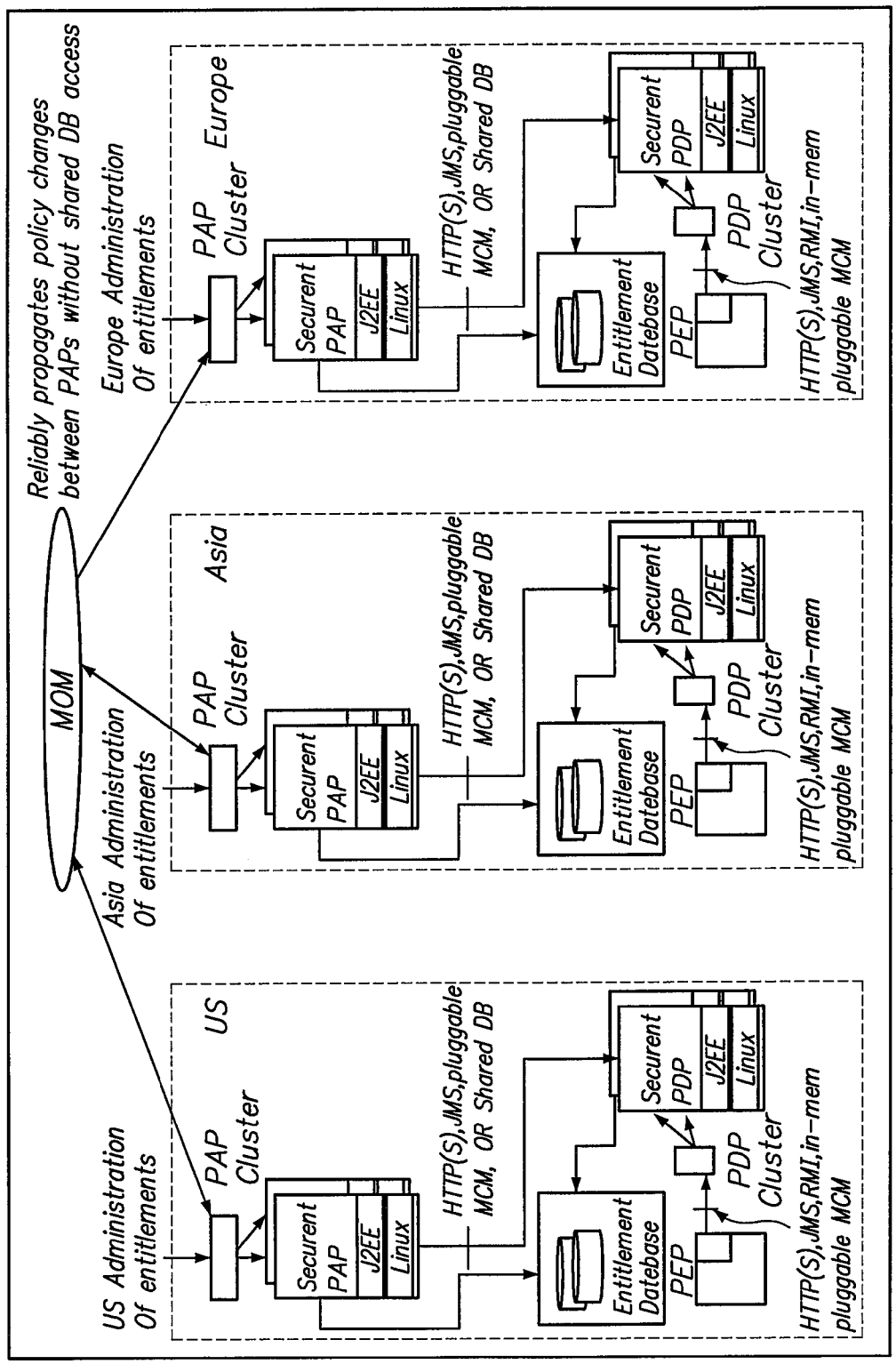
FIG. 6 illustrates a global multi-domain deployment model.

2.5 Cross-Domain Sharing of Entitlement Policies for Globally Scalable Deployments In an embodiment, a data processing system may comprise a plurality of domains each located in a different geographic location. In an embodiment, each domain comprises: a cluster of one or more PAPs coupled to an entitlement repository; a cluster of one or more PDPs; and one or more PEPs at applications. Thus, the PAP is not shared across geographical domains; instead, each geographical domain has a separate instance of the PAP that persistently stores entitlement data locally. The PDPs connect to the local entitlement repository, and therefore do not need to communicate messages directly to the PDP. FIG. 6 illustrates a global multi-domain deployment model.

In an embodiment, policy updates performed in one PAP automatically results in an event that is published to other peer PAPs that are distributed geographically over a highly-available messaging or middleware infrastructure. Alternatively, custom persistence layer mechanisms can also be used to automatically persist and replicate data across multiple repositories.

In an embodiment, PEPs can be configured to failover to an alternate instance of PDPs across domains. Therefore, when a local cluster of PDPs is unreachable, the PEPs will automatically fail over temporarily to other instances of the PDP. PDPs can be deployed that they can be load-balanced within geographical domains.

Entitlement services shared across one or more geographically distributed deployment environment requires entitlement policies to be replicated across various geographical domains without any dependency on a shared database infrastructure. In an embodiment, administrative activities are handled using a consistent entitlement change event propagation approach covering the entire entitlement policy lifecycle. In an embodiment, policy changes in any geographical domain are rapidly reflected in other domains. In an embodiment, there is no shared persistence layer across geographies. Policy administration events in a first geography are reliably propagated to the entitlement repository in other geographies with capability to roll-back policy changes.

In one approach, an entitlement repository could be the authoritative source of policies and is responsible to keep the data consistent. However, using database-level replication of entitlement data has a number of issues that make it particularly unsuitable for handling entitlement policies. For example, auditing policy actions requires policy replication actions to be visible at the service level. Further, regulatory requirements may require non-shared entitlement repositories (domains) that can be configured to have shared applications with consistent policies across geographies while other applications to have their own geography-specific policies. A firewall or other deployment restrictions that may disable sharing of entitlement data across trust-domains. Finally, dependency on a central database or LDAP server creates an additional point of failure with repercussions across the distributed environment.

In an embodiment, two components together provide a scalable solution that does not require a shared entitlement repository or entitlement replication at the data layer. First, a trusted publish-subscribe infrastructure for entitlement specific events is used for reliable delivery of administrative events. In an embodiment, the trusted publish-subscribe infrastructure comprises messaging infrastructure 202 of FIG. 4. Second, three sub-components enable interception and handling of administrative actions:

1. Each entitlement service is configured with a local repository 20 used to persistently store policies locally.

2. Action handlers 204 serve as a pre-hook mechanism to intercept all administrative tasks at each instance of the entitlement solution location. Each handler 204 is configured to publish administrative events to the messaging infrastructure 202.

3. A listener sub-component at a PDP 102A, 102B listens to remotely published events and updates the local entitlement repository 20.

In an embodiment, when a policy event takes place, a configurable action handler 204 responsible for reliably handling the associated type of event is invoked. In an embodiment, the handler 204 is programmatically implemented as an interface named IHandler having the following sample code:
net.domain.admin.sdk.IHandler;
public interface IHandler {
   public void init(Properties props);
   public void handle(Object policy, ActionEvent action)
      throws HandlerException;
   public void rollBack(Object obj[ ], ActionEvent action[ ]);
   public void rollBack(Object obj, ActionEvent action);
}

The IHandler defines life cycle methods for the hook as follows. First, an init( ) method is called by the framework during startup, passing in all the properties which can be configured in the configuration file. These properties can be any arbitrary name-value pairs. For example, if the user wants to write the policy details to database, when events are taking place, they can give the database properties as
<username>johndoe</username>
<Password encrypted="false">richardroe</password>
<url>jdbc:oracle:thin: @131.107.0.10:1521:devbdb</url>
<driver>oracle.jdbc.driver.OracleDriver</driver>

In an embodiment, the database can be initialized in the init method of the handlerImpl class.

Further, a method defined as handle(Object obj,ActionEvent event) method is called with every event configured in a configuration file denoted pap_config.xml. An example list of events configured in pap config.xml is:

TABLE

| EXAMPLE CONFIGURED EVENTS | |
|---|---|
| TYPE | POLICY MAPPING |
| ResourcePolicyMapping | Resource based |
| RolePolicyMapping | RoleBased |
| UserPolicyMapping | UserBased |
| GroupPolicyMapping | GroupBased |
| UserRoleMapping | UserRoleMapping |
| UserHandler | User creation, update, delete |
| RoleHandler | Role creation, update, delete |
| * | All mapping to true |

In an embodiment, an object as defined herein holds a value object with required values from the action that is taking place. For example, when a role is mapped to a resource, the object is a policy object holding the mapping information.

In an embodiment, a rollBack( ) method is a call back method that is called by the framework on the handle method, when it fails to persist the data in the database.

The following sequence of execution may be used for the implementation of handlers 204. In an embodiment, if the handler 204 is enabled in the configuration file, then while performing that task the handle method of the handlerimpl class are called, if the handle method fails to execute, it will not perform the framework task throwing a HandlerException. If the handle method is performed successfully, but the framework event has failed then the method performs a rollback of the event performed by the handlerimpl's handle method.

Thus, various embodiments provide a method and apparatus to enable cross-domain sharing of entitlement policies without depending on database-level replication; a method for propagating entitlement-specific administrative events across multiple entitlement domains; a mechanism for rolling back policy updates; and a method and apparatus to selectively propagate policies only for a subset of the applications/resources for which policies are managed, across domains.

2.6 Entitlement Management Solution for Hybrid Policy Resolution for Custom and Commercial Off-the-Shelf Applications The preceding sections have clarified that embodiments can provide a unique, scalable, enterprise-ready solution for achieving fine-grained or application-specific role-based distributed entitlement. An embodiment a three-tier, loosely coupled, architecture comprising a centralized Policy Administration Point (PAP), one or more distributed, high-speed, localized Policy Decision Points (PDP), and one or more delegated, fine-grained, optimized Policy Enforcement Points (PEP).

In an embodiment, centralized entitlement administration and audit is possible using the Policy Administration Point. The PAP provides central administration, management and monitoring of entitlement policies, with delegation and integration with an entitlement repository. For example, security deployment teams can author policies and provide centralized reports.

In an embodiment, the Policy Decision Point provides evaluation of application-specific authorization policies. The entitlement resolution facility also connects with existing information repositories, e.g., LDAP, databases, that are referred to as PIPs or Policy Information Points.

Each PEP enforces entitlement policy decisions that are made by the PDP for the corresponding application or resource in which it is embedded.

The combination of a PAP, PDP and PEP configured according to the embodiments herein can provide a comprehensive solution for externalized policy-based entitlement management for custom applications implemented in Java, Net or COM. In this case, the PAP is used to model policies that are persisted in an entitlement repository. Policy updates are communicated by the PAP to the appropriate PDP in real-time. PDP uses these updated policies at run-time for authorization decisions. The PEP (Java, Net and COM) intercepts application requests and queries the PDP for policy decisions. No authorization related logic is implemented within the application. Policy lifecycle can be managed either via the PAP UI, or by integrating the PAP functionality into custom admin applications using the PAP SOAP interface.

Commercial applications such as Documentum, CRM systems, etc., may already have entitlements built in into the application. In these cases, it may be impractical or difficult to completely externalize run-time policy decision making from within the applications. In the case of COTS applications, it may not be possible, or necessary, to involve the PDP and PEP in run-time policy decisions. Instead, the PAP may be used for externalized administration of entitlements, providing greater control and visibility for administrators to author and change policies in real-time.

In this deployment model, all policy changes are updated, from the PAP, in native form to the applications, bypassing the PDP and PEP elements, so that the applications can continue to use existing authorization logic and databases at run-time. In an embodiment, custom policy-handlers are configured at the PAP for each application program or application server. The policy-handlers convert policy administration events to application specific calls or DB entries that result in updates to user, group or role based access control lists (ACLs) or access control rules of the application program or server.

However, the PAP DB acts as a central authoritative repository of entitlement policies that can be queried against for audit and review. In addition, policy lifecycle can be managed via the API and UI.

The features of embodiments can be simultaneously applied for both custom applications protected by the PDP as well as write out policies in native format for non-protected entitlement policies. This is achieved by supporting a metadata model that captures the relationship between applications/resources and the authoritative PDP; all PAP-based entitlement policy changes that virtualize PDP identity by allowing entities such as Subjects, Resources and Attributes to be used for policy authoring. This allows migration of PDPs from one model to another over time without change in policies (for example, a move from a legacy entitlement engine to a PDP will not need any change in policies) capability to add multiple custom adapters to write out policies in native format via APIs, DB access etc. simultaneously. In this model policy changes are captured via an appropriate interception callout in the PAP that is configured to talk to one or more external policy handlers over any custom/standard protocol. The system can also provide the ability to consistently author and review policies centrally via the PAP even if policies are enforced/resolved in native form at various PDPs.

Figure 2B:
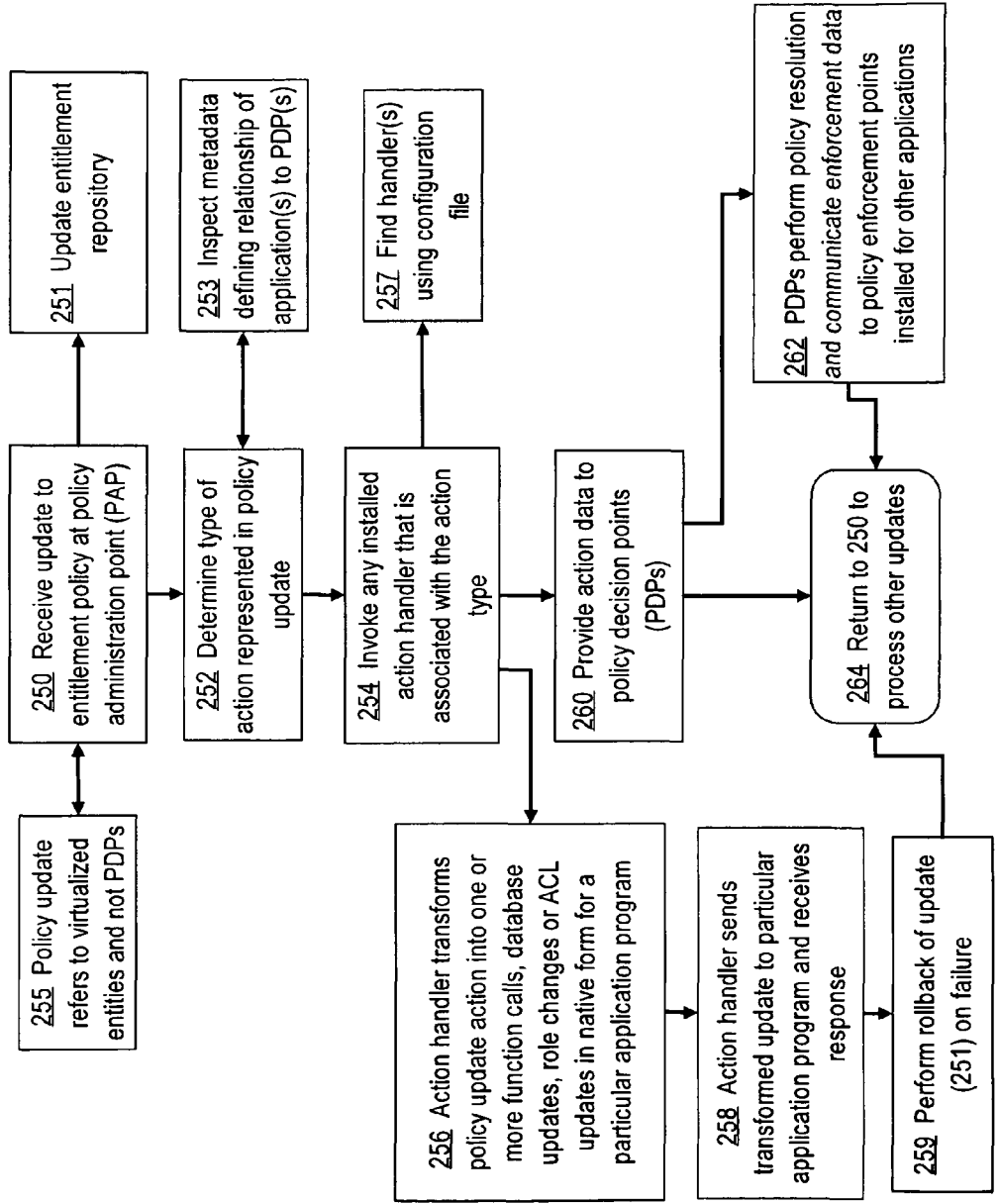
FIG. 2B illustrates a process of hybrid policy resolution.

FIG. 2B illustrates a process of hybrid policy resolution. In step 250, an update is received to an entitlement policy at a policy administration point (PAP). For example, an administrator or other user creates a new policy or modifies a new policy using GUI 22 of a PAP in layer 10. The user typically intends the policy to govern entitlement management of a plurality of application programs including applications that have policy enforcement points installed and legacy or COTS applications that do not have a PEP but implement a native authorization, authentication or entitlement process. The policy is created in terms of virtualized entities such as subjects and actions, and does not explicitly refer to PDPs; as a result, the policy can be used with both kinds of applications and can be re-used if PDPs are removed for a particular application in the future.

In response to the policy update action, the entitlement repository 20 is updated at step 251. In an embodiment, a two-phase commit update process is used for repository 20 so that updates are not committed unless a policy update is successfully communicated to an application program or PDP as described for subsequent steps.

In step 252, a type of action represented in the policy update is determined. Step 252 may comprise inspecting a type of action performed in the GUI or a type value specified in a received SOAP document.

In step 253, metadata defining a relationship of one or more application(s) to PDP(s) is inspected. The metadata informs the process about whether a PDP is installed or configured for an application so that the process can provide action information to the PDP if present.

In step 254, any installed action handler that is associated with the current type of action is invoked. As seen in step 257, installed action handlers may be identified by reading a configuration file that defines the handlers. Action handlers are configured for applications 18A, 18B, 18N that implement native authorization, authentication or entitlement services and for which a PEP cannot be installed or configured.

In step 256, the action handler transforms the policy update action into one or more function calls, database updates, role changes, or ACL updates in native form for a particular application program. For example, a policy update action that creates a new role may be transformed into a Java database interface call (JDBC) to a database associated with a particular application program, or an API call for an API that is exposed by the application. In step 258, the action handler sends the transformed update to the particular application program and receives a response indicating success or failure. The kind of response may vary according to the application program and the action handler is configured to interoperate with any form of response that is provided.

In step 259, if a failure occurred in attempting to update the application program, then a rollback of the update of step 251 is performed. Thus, the repository associated with the PAP is maintained as an authoritative source of update information and updates are committed only if the entitlement mechanism of a legacy or COTS application is successfully updated. In step 264, control returns to step 250 to process other updates to policies that are performed at the PAP.

Additionally or alternatively to invoking a configured action handler, in step 260 action data relating to the policy update action is provided to one or more PDPs. Thus, for those applications that can use PDPs for externalized entitlement management and do not require the use of a native authorization, authentication or entitlement mechanism, PDPs in layer 12 are updated with the policy action that occurred.

In step 262, the PDPs perform policy resolution as appropriate based on the new policy action and communicate any changed enforcement data to PEPs that have been installed for associated applications. For example, in FIG. 2A, PDP 212 receives policy update data from PAP 210 and provides enforcement data to PEP 216 as appropriate. As a result, the PEP 216 can enforce the policy update within an application server 218A, 218B. Further, the process of FIG. 2B as a whole provides centralized administration of policy updates at the PAP, while allowing modification of entitlement mechanisms or information at applications that require use of a native entitlement mechanism for enforcement, or applications that can use an external PEP for enforcement.

2.7 Hosted Multi-Tenant Entitlement as a Service

Entitlement services are used for applications to make decisions on which subjects (people, devices, networks, etc.) should be allowed access to application resources. Traditionally, entitlement processing has been tightly integrated into the application, resulting in duplication of authorization policy logic in multiple applications. Prior approaches have not provided a shared service model. Instead, shared entitlement has been treated as a multi-tier deployment architecture in which programs representing all logical tiers are managed within the same trusted domain.

In an embodiment, entitlement processing is provided as a networked service to support cross-domain applications and collaboration. Embodiments provide technology to effectively deploy a secure multi-tenant entitlement service on the Internet.

In an embodiment, a hosted entitlement service comprises:

1. A sandbox for each customer to define policies, users, resources etc. relevant for applications within their domain of applications.

2. Logic implementing a trust model. Embodiments assume an inherently hostile environment in which an authorization service is deployed. The trust logic enables only applications within specific customer domains to query and receive decision responses.

3. A service listener interface that is used by applications requiring entitlement decisions.

4. A data-model that enables multi-hosting of multiple customers virtually on the same server without requiring a separate deployment of servers of entitlement repositories for each customer.

5. Each application protected within each customer domain can be represented via custom resource types simultaneously and independently for each customer. For example, customer A could be protecting resources such as network devices, documents, etc., while customer B may be protecting resources of transaction, portal type, etc.

Figure 7:
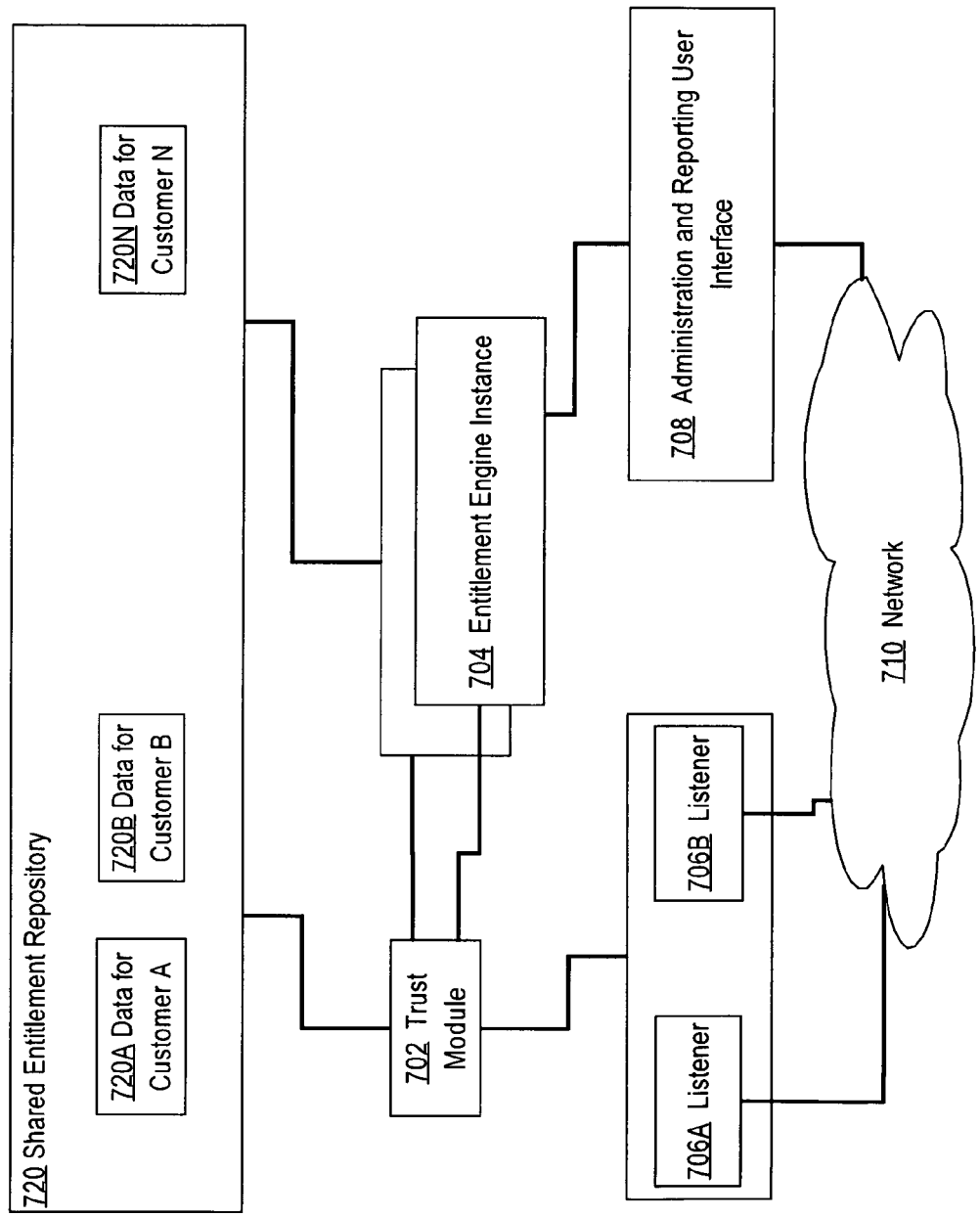
FIG. 7 illustrates an embodiment of a hosted entitlement service.

FIG. 7 illustrates an embodiment of a hosted entitlement service. A shared cluster of one or more entitlement engine instances 704, which may implement a standard such as XACML, are hosted in a data center as a secure service over a network 710 such as the Internet. The entitlement engine instances 704 are coupled to a shared entitlement repository 720 that is virtually partitioned by customers in a multi-hosted deployment. For example, repository 720 comprises a plurality of virtual partitions 720A, 720B, 720N each associated with a respective customer of the service.

An administration and reporting user interface 708 is coupled to the entitlement engine instances 704 and is accessible over network 710. The interface is configured to provide a capability for delegated administration, allowing customers that have computers coupled to network 710 to perform self-service administration of constrained sets of policies. The interface 708 also may comprise a policy review component that allows policies to be reviewed by delegated administrators who are entitled to view policies associated with specific applications.

One or more listener components 706A, 706B are coupled to network 710 and are configured to respond to decision queries received from external application programs or systems and delivered over any messaging protocol such as HTTP(S), MQ, etc. An optional SOAP-based end-point can be used for SOA-enabled service invocation of the entitlement service hosted in the internet.

A trust module 702 is coupled to listeners 706A, 706B and to entitlement engine instances 704, and is configured to verify trust for all incoming requests for applications within customer domains.

2.8 Algorithm for High-Performance Hierarchical Role and Rule Based Entitlement Policy Resolution Entitlement policy resolution benefits from high performance execution of complex programmatic logic, including resolution of associations of users or other subjects with roles, handing of policy inheritance in the resource hierarchy, conflict resolution, use of one or more attributes in policy resolution, and determination of additional information (or attributes) that need to be sent back to the application requiring resolution of policies. In an embodiment, the system disclosed herein comprises program logic or electronic circuitry that implements an algorithm for processing incoming decision queries and evaluating policies in a high-performance manner that is scalable to large data sets.

In an embodiment, the system models resources, to which entitlement policy decisions are applied, hierarchically. Each resource can have only one parent and multiple children. There is no limit on the number of children each resource can have. Each resource can be described by a set of attributes. These attribute values can be made use of in the policy evaluation.

Roles and Groups as resources are also modeled hierarchically. As in the case of resources, roles and groups can have only one parent and multiple children. However, a reference to the groups and roles can be created. For example, a user or administrator can create a role or group named 'Admin' at the root level and refer to that group anywhere in the hierarchy. An example hierarchy is:

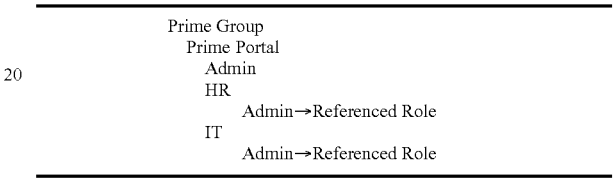

In the foregoing hierarchy, the role Admin is created only once, but is referenced twice in the hierarchy; this approach allows a role to have multiple parent roles. As resources, roles and groups also can be described using attributes, and the values of attributes can be used in policy evaluations.

Given the Role and Resource hierarchy, policies associate a subset of the roles with the subset of resources (either Allow/Deny) as follows:

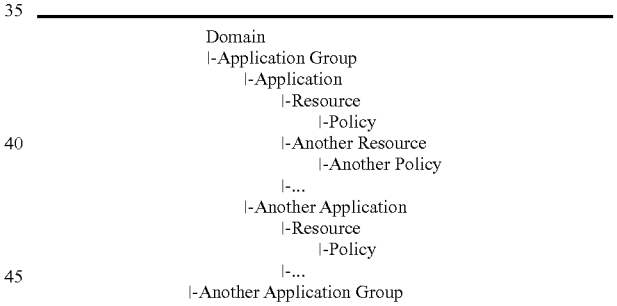

Users, Groups, Roles, Rules and separation of duties (SOD) or dynamic SOD rules can be assigned at the Policy level arbitrarily with Global scope or scoped specifically to an application or application Group context.

In an embodiment, each PDP uses the following algorithm to resolve the policies applicable for the requested resource.

1. Get all the roles applicable for the given Subject(s) for the given Context (one or more hierarchical environmental values) and Role Bundles (an optional environmental variable that specifies additional context in which user Role membership is determined). If the Context and Role Bundle are not supplied, the default context and role bundle are assumed.

2. If there are no roles applicable for the subject in the given context, the PDP checks for the roles in the parent context until it reaches the root context.

3. The roles applicable for a subject can be directly associated with the subject or indirectly through group memberships. In case of group memberships too, the group hierarchy is traversed to get all the group memberships as well as their roles based on the role bundle given.

4. If there are no roles applicable to the user then a decision of 'Not Applicable' is returned.

5. Check for dynamic separation of duties rules if there are two subjects supplied in the request.

6. For each of the roles applicable (as evaluated in step 1 and 2 above), get all the applicable policies for the resource requested. If there are no policies applicable for a role and the requested resource, the parent hierarchy is traversed to find out the applicable policies.

7. If the role the subject directly belongs to doesn't have any policies associated with the request the role hierarchy is traversed and all applicable policies for the roles in the hierarchy are aggregated.

8. If the requested resource is of type "action," then first check for all policies directly associated with the requested resource (action). If there are no applicable policies then the policies on the same named action for the parent resource is checked. In the resource hierarchy given below, if the requested resource is Report2:View, the PDP first checks for applicable policies directly on Report2:View, if not then it checks for policies on Report2, if no policies are applicable then it checks for Reports:View and so on and so forth until it reaches the root of the resource hierarchy.

>
> Reports
> View
> Edit
> Report1
> View
> Edit
> Report2
> View
> Edit

9. One or more policies have been collected using the foregoing steps 5-7. Each and every policy is then evaluated and the results of each policy are collated. In case there are conflicts then the policy combining algorithm is applied and the conflict resolved and the final decision is returned.

In an embodiment, the foregoing algorithm works efficiently even in the context of no explicit policy assignment to a Resource via inheritance of policies from a higher-level Resource. Similarly, a direct association of policy is not needed for a user's Role, due to Role inheritance. Dynamic segregation of duty (DSoD) checks are also handled by the algorithm by computing exclusion sets at run-time during the process of evaluating role conflicts on target Resource when there are multiple Subjects.

2.9 Entity Model

Figure 8:
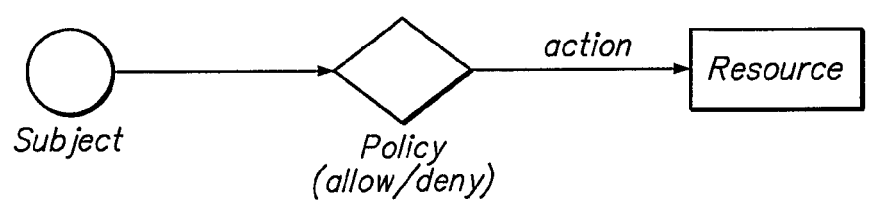
FIG. 8 illustrates relationships of a subject, policy, action and resource.

In an embodiment, policy-based application entitlement ensures that a Subject accessing a Resource (or invoking an Action on the Resource) is allowed or denied based on Policies. In an embodiment, a data model consists of Subjects, Resources and Policies. Each of these constructs is typed, and hence extensible enough to describe policies in varied heterogeneous environments. FIG. 8 illustrates relationships of a subject, policy, action and resource.

Figure 9:
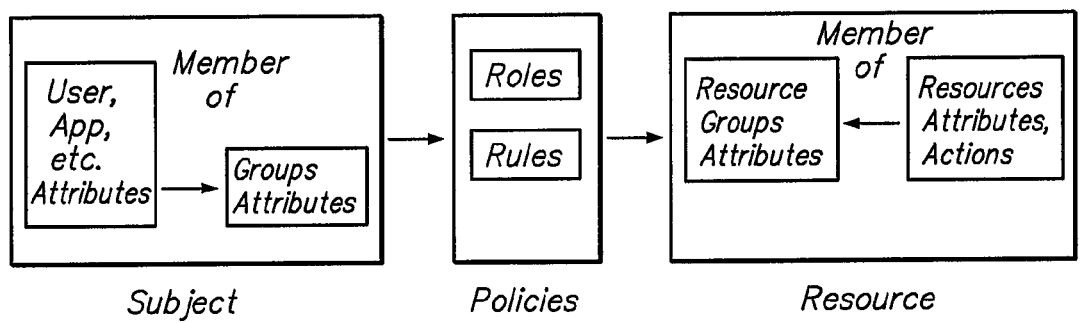
FIG. 9 illustrates relationships of a subject, policy, and resource in further detail.

In this model, each Subject (such as a user) is represented by a set of Attributes (such as Name, Group, etc.) and is accessing an Object (such as an application, transaction, document, portal resources, etc.) that is represented by a set of Resource Attributes (such as Document Name, Document owner, etc.). An Object is protected by policy that encapsulates rules that reference Subject, Resource, Message and other contextual Attributes required for decision resolution. FIG. 9 illustrates relationships of a subject, policy, and resource in further detail.

Figure 10:
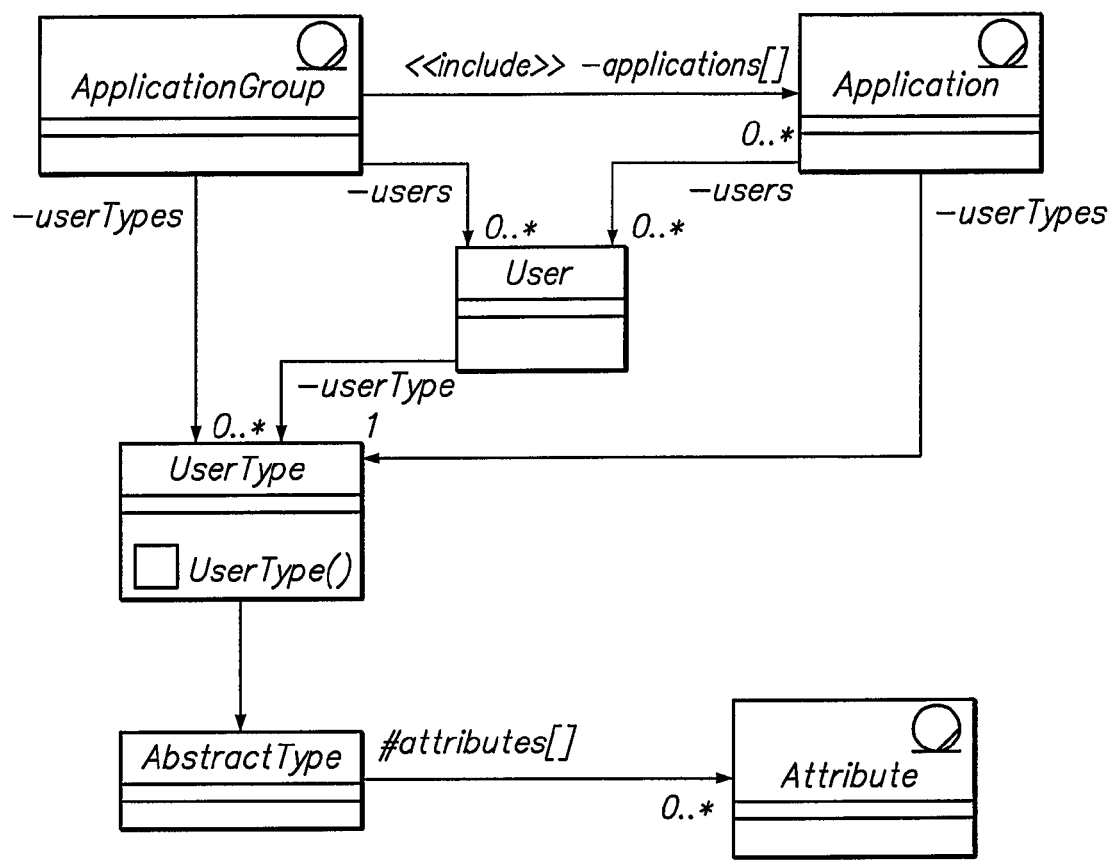
FIG. 10 illustrates an example data organization for subject elements.

Subjects are associated with a mandatory Subject identifier attribute used to identify the subject on whose behalf run-time policy decisions are made. Subject identifiers are typically the authenticated identity of a user or application accessing the Resource. This authentication is typically done outside of the scope of the entitlement management system. FIG. 10 illustrates an example data organization for subject elements.

In an embodiment, Subjects have the following characteristics. Subjects are uniquely identified within the context of applications or application groups via the Subject-Identifier that is the run-time identifier on whose behalf an authorization decision is desired. Subjects can be people, applications, devices, etc. Each type of subject has its own type of attributes that identify the appropriate Subject. For example, an Employee subject type may be a subject with the attributes first name, last name, email, phone number, location code, and organization code, whereas a Customer subject type may be a subject with the attributes first name, last name, email, phone number, customer code, and employee sponsor.

In an embodiment, a Subject-type enables user-specific addition of application-specific Subject attributes. Any Subject can be declared to be of a particular Subject type and automatically the Subject is associated with the attributes. Default values for attributes can be set during creation of Subject types.

The authoritative source of Subjects can be external and independent of the system herein (such as an enterprise LDAP, Active Directory, Database, etc.) without need for replicating the data in the entitlement management system.

Subject attributes that are typically non-application specific can be managed in an external User-directory while other Application-specific Subject attributes can be managed within the Application-related metadata managed within the entitlement management system. Attributes referenced in policy can be a combination of both user-directory and application-directory attributes.

A Resource is any protected entity whose access needs to be secured by policy. Resources can apply to a diverse set of real world things. For example, Resources can model any of the following:

Physical resources: Documents, files, mutual funds, insurance claims, stocks, binds, servers, network devices, and networks.

Web components: Buttons, links, web pages, portlets, etc.

Application objects: Methods, classes, beans, data types, etc.

Transactions: Trades, instant messages, and transaction server and messaging service communication such as JMS or MQ Series topics or messages.

Data: Physical data records or files, database rows or columns, and database functions or procedures.

Figure 11:
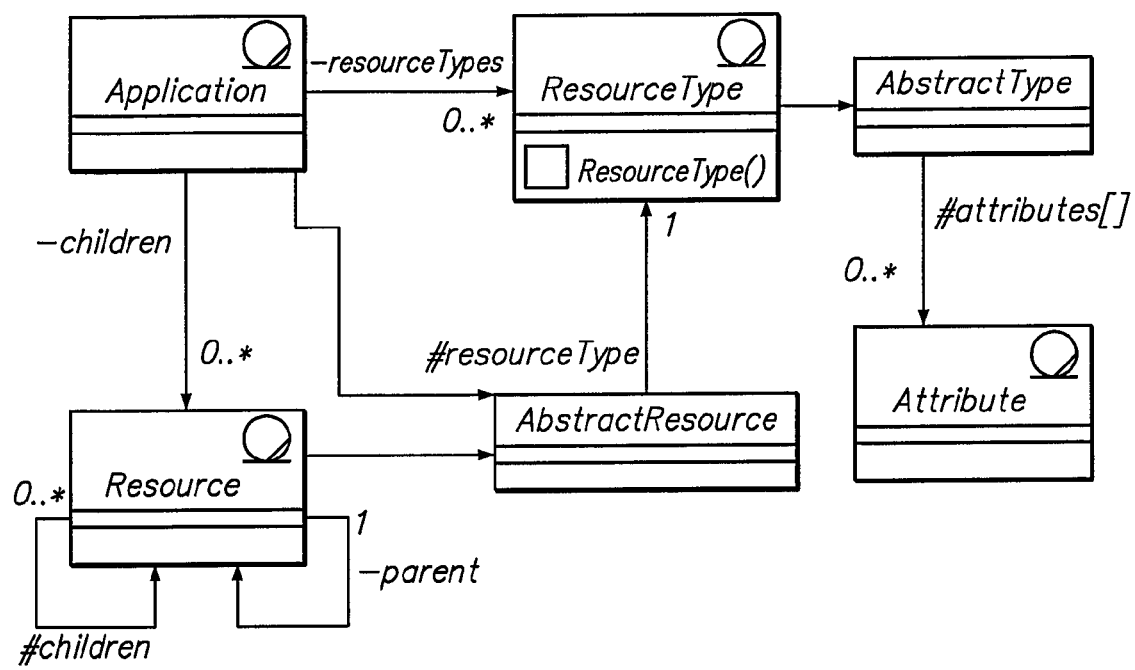
FIG. 11 illustrates an example data definition of Resources.

Other examples of Resources include business units, geographical locations, people, network segments, etc. FIG. 11 illustrates an example data definition of Resources. In an embodiment, Resources have the following characteristics:

Resources are uniquely identified within the context of applications or application-groups via a fully qualified name (FQN) that is the run-time identifier of the target resource being protected by policy. For example, Application Group Name: Application Name: Resource Name 1: Resource Name 2: . . . :Resource Name n' is a typical FQN for a Resource.

Resources can be typed and can represent diverse types such as portals, documents, devices, buttons, transactions, chat sessions, etc. Each Resource Type is identified by a combination of a collection of Attributes that identify the appropriate Resource. For example, a document Type may contain attributes such as: Document name, Author name, date, sensitivity level, etc. In addition to attributes, Resources are also associated with zero or more Actions that can be invoked on a Resource. In the document example, there may be 4 valid Actions: Read, Write, Open and Close. A Resource of Document type can be protected as a whole or each individual Action can be protected. In any case, anytime a Resource of a particular type is created, the Resource gets automatically associated with Attributes and Actions that can be set appropriately for that Resource.

Some Resource attributes may be managed in an external data-store while other Resource attributes may be managed as Resource Attributes described above. External Application-related attributes can be associated with Applications or Application groups and can be referenced in policy.

Resources can be secured as a whole or by individual Actions that can be performed on the resource. For example, if a document is the protected resource on which Read and Write actions can be performed, then protecting the named action will leave the other actions unprotected. Protecting the entire resource will protect all actions that can be performed on the resource even if they are not predefined. By default, Resources that do not have an "Allowed" policy for a Subject (either explicitly or via inheritance) are denied access to resource/action.

In an embodiment, Policies are rule and role-based and are flexible enough to handle varying granularities of authorization. A spectrum of policies from simple application-specific role-based access control of portals, to dynamic, rule based Separation Of Duties (SoD) policies during collaboration are handled in a consistent and easy-to-use manner. The policy model provides a rich hierarchical model of resources, subjects, obligations and actions compatible with other implementations of RBAC and XACML.

Figure 12:
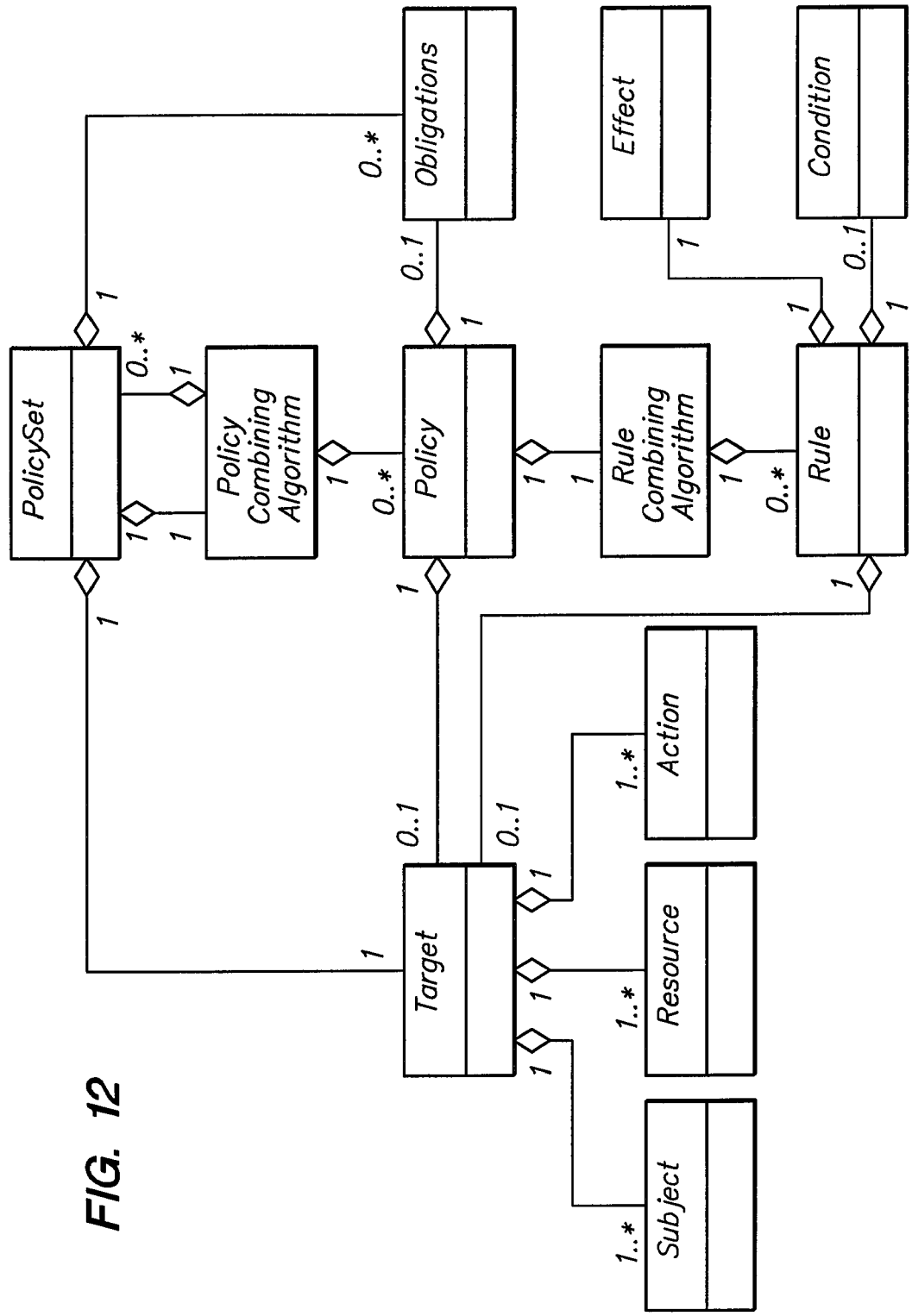
FIG. 12 illustrates example data structures for implementing policies and related data items.

In an embodiment, Resources, Actions or Subjects are protected by a set of one or more Policies (called PolicySets). Conflicts between policies in a PolicySet are resolved via policy combining algorithms (for example, Deny-overrides, Permit-overrides, etc.). (Policy combining algorithms are explained in detail below.) A Policy in turn contains one or more rules that support a rich condition-effect syntax enabling the expression of complex rules in a standards compliant manner. In an embodiment, the XACMI policy language is used to define policies. FIG. 12 illustrates example data structures for implementing policies and related data items.

In an embodiment, in addition to returning a decision, the entitlement engine returns one or more "Obligations" to the PEP. Obligations allow the PDP to communicate certain requirements/constraints that the PEP should follow while using the decision. For example, an Allow decision may be communicated to the PEP but with the constraint that the PEP is obliged to log the request, or add certain attribute values in the session cache, etc.

In an embodiment, the following policy combining algorithm is used.

1. Deny-Overrides: If the resource has a single Deny policy irrespective of the number of Allow policies, then the result of the Rule combination shall be Deny. So, if this rule is selected, the Deny policy overrides all the Allow policy granted to that particular resource.

2. Permit-Overrides: Likewise, selecting this rule, the Allow permission overrides all other permissions granted to the policy.

3. First-Applicable: This rule considers the way policies are listed for a resource. Applying this rule enables the application to choose the very first policy granted to the Role.

4. Only-One-Applicable: When there is only one policy for a resource, the algorithm will evaluate the same whether Allow or Deny. If there is more than one policy, it will evaluate to indeterminate.

5. Lower-Role-Overrides: This rule uses the decision for the lowest role in the Role hierarchy.

6. User-Based-Overrides: On selecting this rule, the PDP will override the user-based policies created for the specified user while giving decision on the basis of Role-based policy.

2.10 Policy Model

In an embodiment, policies are normalized into an XACML data model that is stored in repository 20. In an embodiment, a decision query request to the PDP consists of attributes associated with the requesting subjects, the resource acted upon, the action being performed, and the environment. In an embodiment, a response contains one of four decisions: permit, deny, not applicable (no applicable policies or rules could be found), or indeterminate (some error occurred during processing). In the case of an error, optional information is provided to explain the condition. In an embodiment, responses may also include obligations, which are directives from the applicable policies which the PEP is obliged to execute.

Figure 13:
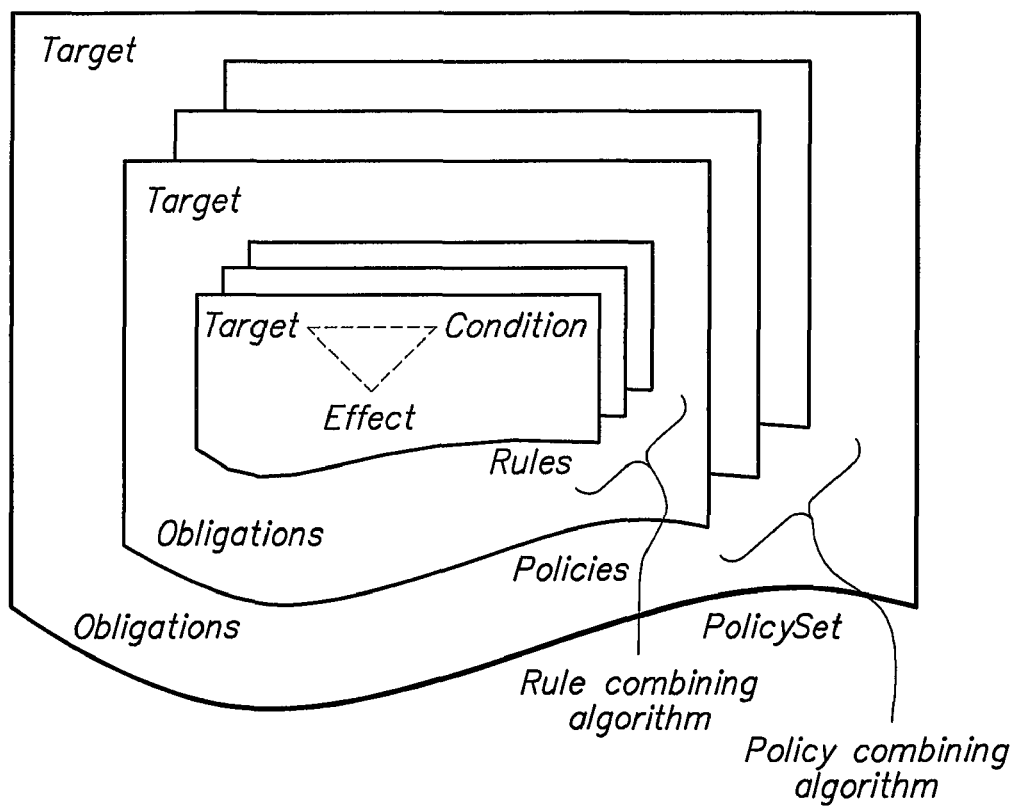
FIG. 13 illustrates relationships of targets, obligations, rules, policies, and policy sets.

FIG. 13 illustrates relationships of targets, obligations, rules, policies, and policy sets. In an embodiment, XACML policies consist of an arbitrary tree of sub-policies. Each tree represents a target, while the leaves of the tree contain a collection of rules. The target is a simple set of criteria (on Resources, Subjects, Actions or Environment) to determine a policy's applicability to a request, while the rules contain more complex logic that makes XACML extremely expressive, and therefore able to handle complex policy requirements.

In an embodiment, in addition to expressing access control logic within a single policy, policies can include references to other policies. This abstraction achieves the goal of modularly building complex policies while also providing a mechanism to handle policy conflicts. In effect, a single policy can consist of any number of decentralized, distributed rules, each managed by different organizational groups. A supporting language feature is XACML's use of combining algorithms, which define how to take results from multiple rules or policies and derive a single result. As with data types and functions, there are a number of combining algorithms defined (first applicable, deny overrides, etc.), as well as an extension mechanism used to define new algorithms.

In an embodiment, policies depend on getting access to attribute values associated with Subjects, Resources, etc. Two mechanisms are used to resolve attribute values within policy logic: AttributeDesignators (which reference values by identifier, data type, and other optional meta-data), and AttributeSelectors (which use XPath expressions to find values). The PDP can access external attribute values via pluggable data access modules.

In an embodiment, policies are created via a two step process:

1. Define the collection of permissions associated with a Role (application, Application group or enterprise-wide)

2. Decide either statically or dynamically (at run time) which users are associated with what Role Logic implementing a variation to the above steps allows a user to directly associate rule-based policies for users or groups or users without explicitly defining Roles. In either case, the underlying policy resolution logic in works the same way.

In an embodiment, Assignment of Permissions to Roles is implemented as follows. In many situations, the end result of policy evaluation at run-time, is an "allow" or "deny" decision for a specific Subject based on the Subjects' membership in a Role. In this context, the collection of privileges (both positive and negative) associated with a Role are modeled resulting in an access control matrix. FIG. 14 is an example of an access control matrix. An access control matrix such as this is helpful in determining (or modeling) permissions on paper before attempting to build the model.

Figure 15:
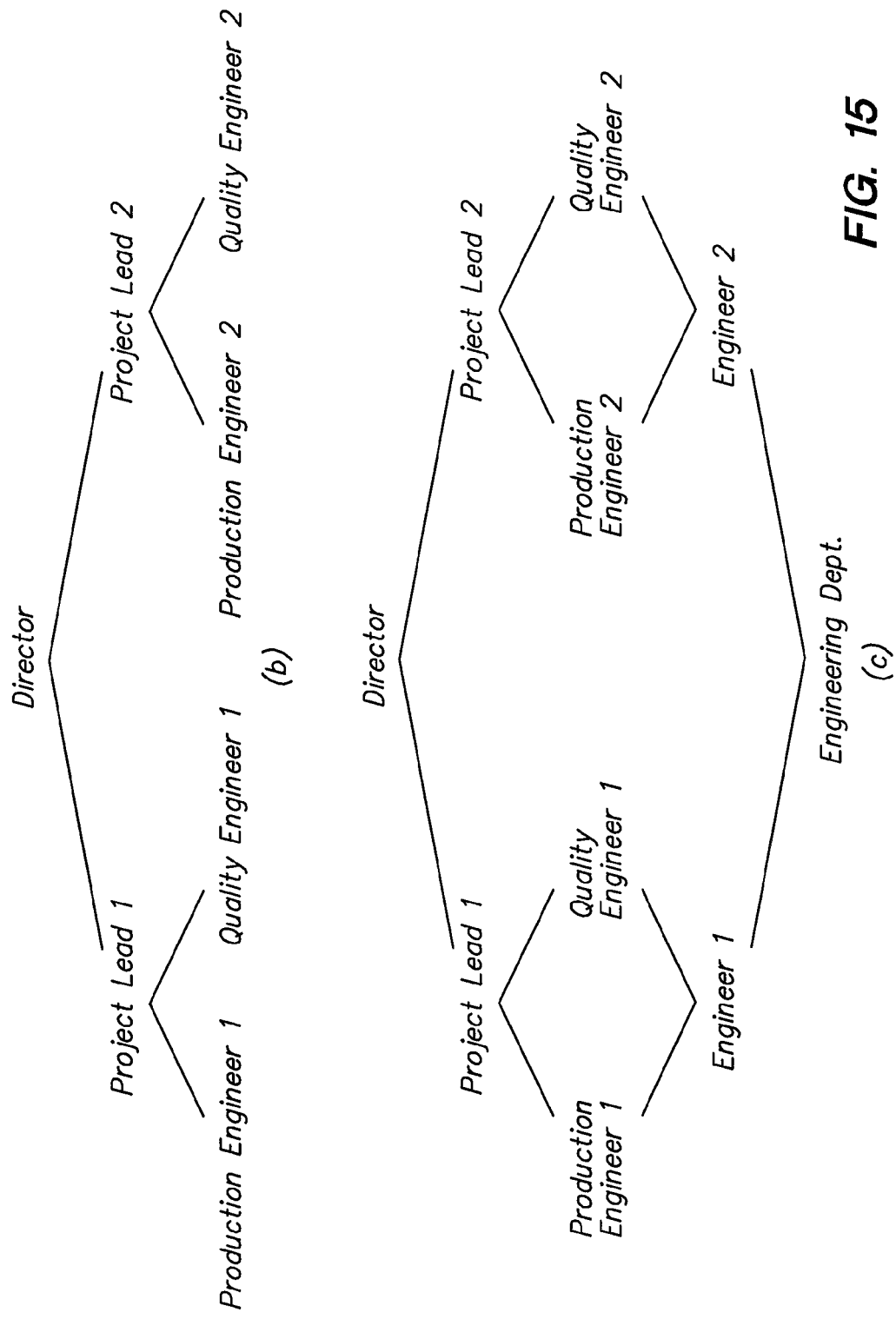
FIG. 15 view (B) illustrates an inverted tree role model and FIG. 15 view (C) illustrates a lattice role model for example role names in a hypothetical enterprise.

In an embodiment, Hierarchical RBAC is implemented. Implementing hierarchical RBAC may use a tree, inverted tree and lattice approach. The inverted tree model enables higher-level roles to add to privileges that may be granted to lower-level roles. For example, a project lead has all privileges of a production and quality engineer in addition to privileges assigned to project leads. A lattice model is also implemented using the capability to reference roles while creating a role hierarchy, and support for multiple inheritance. FIG. 15 view (B) illustrates an inverted tree role model and FIG. 15 view (C) illustrates a lattice role model for example role names in a hypothetical enterprise.

In an embodiment, Assignment of Roles to Subjects is implemented in logic as follows. Subjects can be statically assigned to roles via explicit assignment or a Subjects' association with a Role can be determined via dynamic evaluation of rules or policies at runtime. Logic in the elements of FIG. 1 supports both a static and dynamic approach for Role assignment. Roles determined via dynamic evaluation of rules or policies at run-time are called a Dynamic Role. Examples of Dynamic Roles include assigning subjects with the attribute employee to the Employees role or assigning subjects with an account balance of greater than $100,000 to the Platinum Trader role.

In an embodiment, Scoping of Roles is implemented in logic of elements of FIG. 1 as follows. In many situations the Resources or attributes of a Resource to which the Role grants access should be limited (or scoped). In this case certain attribute values of the Resource act as a means to scope the privileges of a Subject. For example, a Subject (for example, Joe) may be associated with a WiresAdministrator Role, but only for accounts with the location attribute set to California. Attributes associated with Subjects, Resources and Roles can be used to scope the Role to achieve this effect. Additionally, logic in FIG. 1 allows users to choose the relevant scope attributes as well as entity attributes that need to be returned back to the application for further processing.

In an embodiment, Contextual Assignment of Roles is implemented in logic of elements of FIG. 1 as follows. A Subject is not typically provided blanket set of privileges. Instead, Subjects are typically assigned different set of Roles in different contexts. For example Joe may be associated with WiresAdministrator and WiresUser Roles during work hours, but may be associated with the WiresUser Role after-hours. This capability to contextually assign a set of Roles to Users is accomplished with the use of "RoleBundles"—providing a convenient mechanism to assign users to a collection of Roles that are assigned in different contexts.

In an embodiment, Delegated Administration is implemented in logic of FIG. 1 as follows. Since there are multiple Applications, Resources and Groups of Subjects that are all being managed from the same administration environment, there is a need to allow delegated administration of these entities. The logic of FIG. 1 supports the capability to delegate administration up to an individual Resource level, as well as individual Subject Group level enabling multiple administrator ownership even within the same User population and Application.

In an embodiment, Delegated Self-Administration for Multi-Tenant Applications is implemented in logic of FIG. 1 as follows. In addition to delegated administration of Resources and Groups, for applications that are hosted in a multi-tenant model, wherein an application is offered as a Service to multiple partners/customers, there is a need to create the notion of a hierarchical delegated context allowing autonomous delegated control to administrators to create mappings of Subjects to Roles, and association of privileges to Roles. This model supports a default context in which Roles and their associated privileges are defined, and allows delegated administrators to inherit/override these default mappings and privileges for their domain is supported via the "Context" construct.

2.11 Example Architecture and Application Programming Interfaces

In an embodiment, the system of FIG. 1 allows externalized policy-based entitlement of Resources at various layers in a logical stack of information technology elements. Four common layers where entitlements may be implemented include a presentation layer, business process layer, component logic or application layer, and data access layer. In the presentation layer, entitlements may be needed to control the display of buttons, tabs or other GUI widgets of a web application or portal. In an embodiment, tag libraries for web applications and portal agents implemented in Sharepoint, J2EE, etc., can implement entitlement management.

In the business process layer, entitlements may be needed for control of tasks and process execution based on process state. Entitlement management may be implemented using an agent for web-services or business process management. In the component logic layer, entitlements may be needed for control of Java/.Net method invocations and entitlement management may be implemented using an agent for J2EE/.Net applications. In the data access layer, entitlements may be needed for control of what data is returned from database queries, and entitlement management may be implemented using an agent for data filtering at the OR/DAO layer or at the DB server.

In an embodiment, the tiered architecture of FIG. 1 enables codeless protection of Resources in all the above tiers via agents. The agents typically intercept messages at the container-level and enforce policies with the use of the PEP. In these cases developer involvement is minimal (if any) and is largely confined to configuring the appropriate container-specific configuration files.

In an embodiment, there may be situations where Resources that are not container managed, or Resources that require protection via code need to resort to making API calls such as "isUserAuthorized( )" calls. Such APIs for decisions are supported via the PDP APIs. Similarly there are applications that need to make API calls for administration such as to grant/revoke user privileges, query available Resources, etc. Such administrative calls are supported via the PAP APIs. Both PDP and PAP APIs are supported via packages in Java, NET, and COM-based libraries.

In an embodiment, a Java PEP may be provided in the form of a jar file. This library exposes APIs that can be directly invoked from any Java-based application. This is also the library which is used by container-specific agents for enforcing policies at the container level. The Java PEP may support Java libraries for both decision and administration APIs.

In an embodiment, .NET based applications can be entitled using a PEP for NET. In an embodiment, the agent is a DLL which can be made use of by any NET based application (either a desktop or a web based application). A COM-wrapped agent is also supported in an embodiment for VB, C++ and other Windows-based applications. As with the Java PEPs, the NET PEP supports libraries for both decision and administration APIs.

Figure 16:
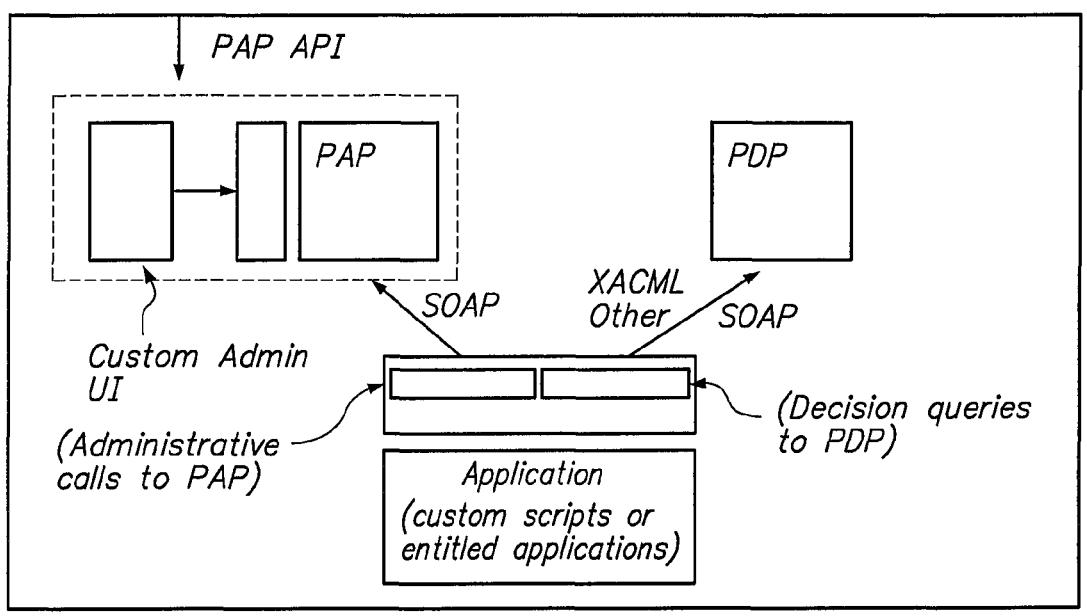
FIG. 16 illustrates a Policy Administration Point (PAP) API and a Policy Decision Point (PDP) API in an example embodiment.

FIG. 16 illustrates a Policy Administration Point (PAP) API and a Policy Decision Point (PDP) API in an example embodiment. The packages shown in FIG. 16 may be used for customization and easier integration of the components of FIG. 1 with customer deployments. In an embodiment, the following categories of functionality are supported: creation of custom administrative consoles [use the PAP APIs]; invocation of decision queries from applications [use the PDP APIs]; run-time queries to the PAP for creation of automated scripts or policy queries from applications [use the PEP APIs].

Figure 17:
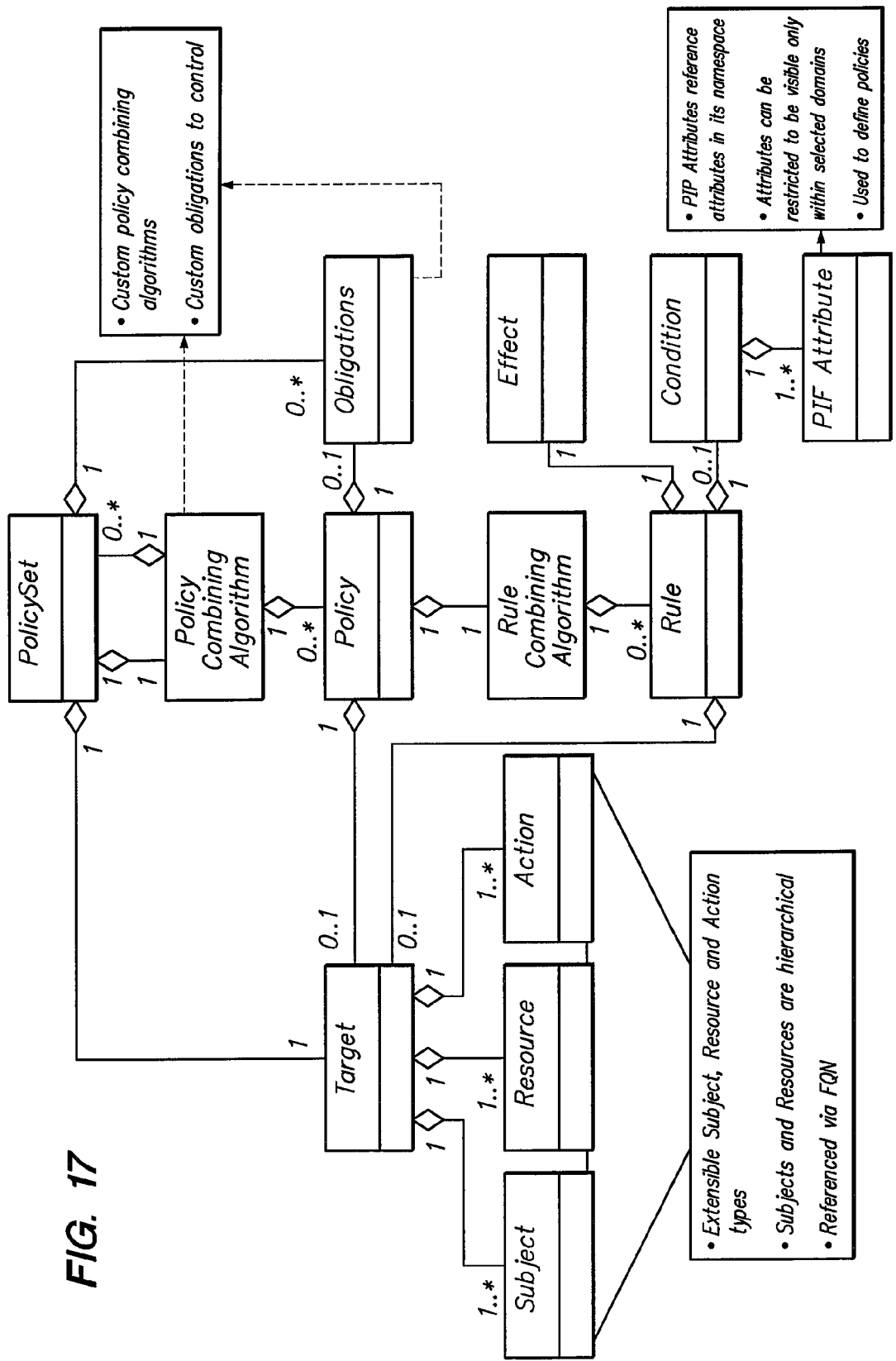
FIG. 17 illustrates extensibility interfaces.

In an embodiment, Administration APIs are implemented as follows. The PAP API helps in accessing a broad set of functions which are enabled through the PAP UI. A user can make use of these API to create your custom UI or to write scripts which make creation of users, roles, applications etc a lot easier rather than to create them using the UI one at a time. A non-exhaustive list of the various functions that supported by the PAP UI and the SOAP APIs (accessible via the NET and Java APIs) is listed below:

Application Groups/Applications
    Create
    Update
    List
    Delete
Resources/Actions
    Create
    Update
    Delete
    List
    Assigning resources/actions to application
    Assigning an application to application group
Users/User Groups/Roles
    Creation of users, groups and roles, and their types
    Updating of users, groups and roles, and their types
    Deleting of users, groups and roles, and their types
    List of users, groups and roles, and their types
    Searching of users, groups and roles
    Mapping of users to roles
    Mapping users to groups
    Assigning roles to groups
Attributes
    Create and assign Attribute Sources
    Define Attributes
    Configure Attribute Source caching and other properties
Policies (Role and Rule based)
    Create
    Update
    Delete
Review and Audit
    Search/List Admin logs
    Search/List Decision logs
    Review SoD violations
    Review User/Group and Role-based Resource entitlements
Administration
    Creation of trust model between components
    Setting for PDP failover o Delegation
    PAP entitlement In an embodiment, Decision APIs are implemented in the logic of FIG. 1 as follows. The Interface provides the methods for checking the whether the user is entitled to access a given resource/action in the Policy Enforcement Point (PEP). This interface also provides two utility methods, which return back a list of permissible resources for a given user and a list of permissible actions for a given resource. A non-exhaustive list of APIs supported by the PDP APIs include:

Check for access to a given resource/action for a particular user by passing subject, resource, action
    Check for access to a given resource/action for a particular user by passing subject, resource, action, attributeMap (when the custom attributes are passed), RoleBundles and Contexts
    Get a list of permissible resources for a given user
    Get a list of permissible actions for a given resource
    Get a list of Roles for a given resource In an embodiment, Extensibility Interfaces are implemented in the logic of FIG. 1 as follows. In addition to the PAP and PDP APIs, the logic allows on-the-field extensibility to customize various aspects of the policy infrastructure. These extensibility APIs can be broadly classified into Administration-time extensions and Decision-time extensions. FIG. 17 illustrates extensibility interfaces.

Administration-time extensions allow administrators to extend the functionality of the PAP. PAP extensions include capability to convert policies to legacy formats that can be enforced natively within COTS/legacy applications, and import/export of policies into the entitlement management system of FIG. 1.

In an embodiment, the logic of FIG. 1 supports pre-hooks which can be used to initiate a work flow from within the Admin Console or the Policy Administration Point (PAP). In addition to workflows, pre-hooks can be used as a means to allow the PAP to be used for policy authoring and review even when policy decisions and enforcement happen outside the scope of a PDP or PEP. All administrative actions are configure-ably intercepted by the handlers 204 and appropriate actions can be triggered, including writing out policies in legacy/native forms. An example interface for a pre-hook handler has been set forth above. In an embodiment, the IHandler interface also exposes a rollback method that can be implemented to handle error conditions that require rollback previously handled policy events.

In an embodiment, Importing/Exporting Policies is implemented in logic of FIG. 1 via XML-based files both using APIs and using the PAP UI. Additional utilities can be provided, such as a utility to convert spreadsheet-based entitlement information into policies within the system of FIG. 1.

Decision-time extensions allow the PDP functionality to be extended by allowing plugging in of custom Attribute sources, or plugging in custom listener frameworks.

Custom Attribute Sources may be implemented in the logic of FIG. 1 as follows. Attribute sources are used to obtain additional information from an external source which will be made use of in policy evaluation. In an embodiment, the logic of FIG. 1 supports attribute sources such as LDAP, Microsoft Active Directory, database and a Java source. Adding a custom attribute source comprises adding the source to the administration console or the PAP and ensuring that the decision engine or the PDP is able to evaluate the attribute source. Adding a new attribute source to the admin can be accomplished by adding a XML file which defines the meta-data about the attribute source to be added. The meta-data might contain information about how to connect to the source. In an embodiment, the decision engine then makes use of the implementation of the interfaces defined below so that the attributes can be evaluated and their values made use of in the decision process.

```
public interface IAttributeEvaluator
{
    Public Object evaluate (IAttribute iAttribute, IPIPMetaData
    pipMetaData, IXacmlContext xacml, IRule rule, Rules rules)throws
    Exception;
}
```

The above interface is implemented to permit the PDP to get the attribute values.

In an embodiment, a Custom Listener Framework provides a way to add transport protocols for communication between the PEP and PDP. In an embodiment SOAP over HTTP, XACML over HTTP and RMI are supported in the logic of FIG. 1. Adding another protocol can be done so by implementing the following interface.

```
public interface ITransportAdaptor
{
    public void init(PdpObject pdpObj);
    public Object send(XacmlRequest request) throws Exception;
    public PdpObject getPdpObject( );
}
```

In an embodiment, the administration console or the PAP and the decision engine or the PDP perform authentication of users before the two components can provide services. In an embodiment, the logic of FIG. 1 supports authentication against its entitlement repository 20 or against a LDAP repository. Other authentication providers, for example, JAAS, can be added by implementing the following interfaces.

```
public interface IAuthenticator {
    public boolean authenticate (String username, String password);
    public List getRoles(String username);
    public boolean isSuperUser(String username);
}
public interface IAuthProvider
{
    public IAuthenticator getAuthenticator(Properties props) throws
    Exception;
    public (Authenticator getAuthenticator( ) throws Exception;
}
```

3.0 Implementation Mechanisms—Hardware Overview

Figure 18:
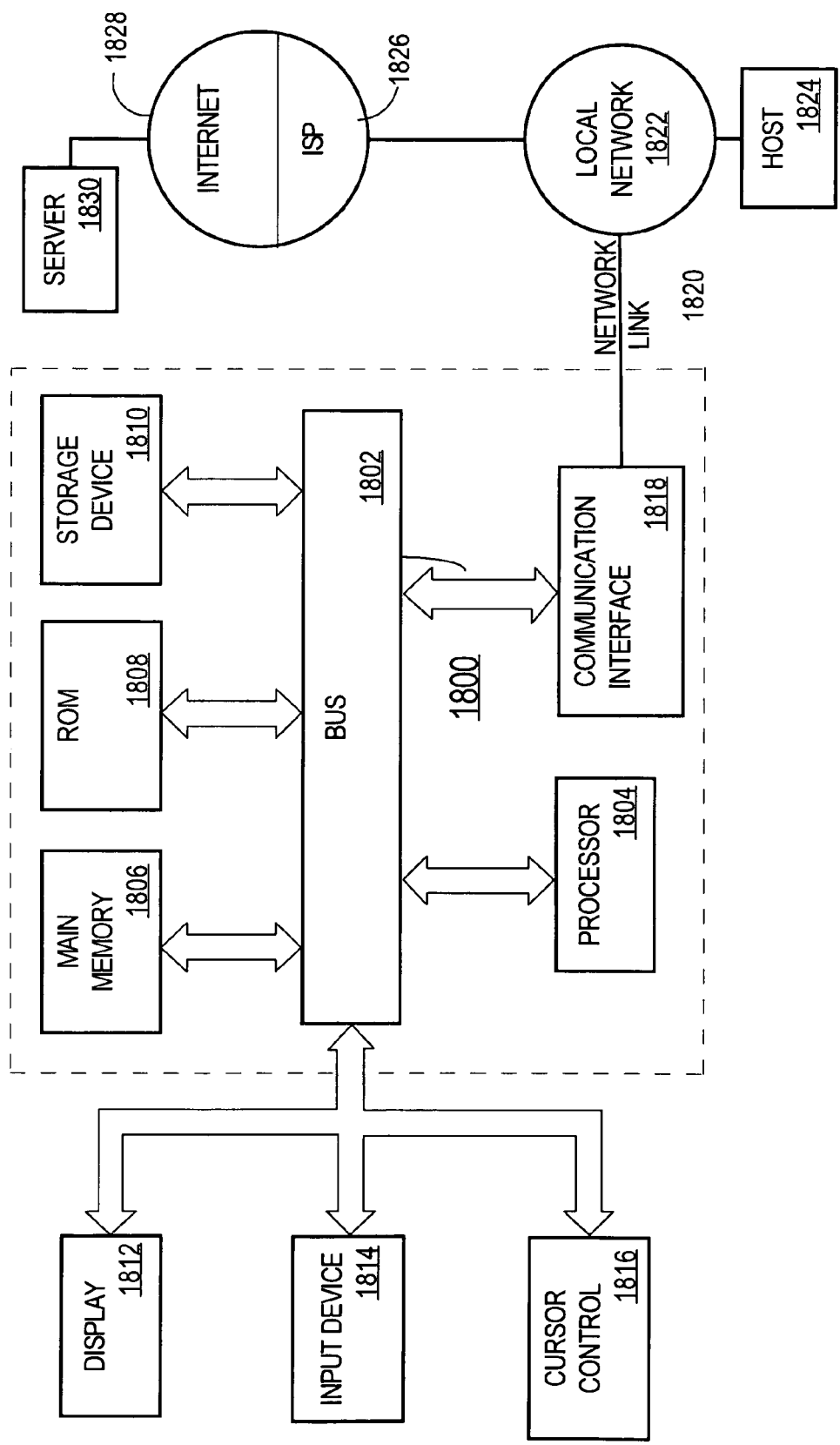
FIG. 18 illustrates a computer system upon which an embodiment may be implemented.

FIG. 18 is a block diagram that illustrates a computer system 1800 upon which an embodiment of the invention may be implemented. Computer system 1800 includes a bus 1802 or other communication mechanism for communicating information, and a processor 1804 coupled with bus 1802 for processing information. Computer system 1800 also includes a main memory 1806, such as a random access memory (RAM) or other dynamic storage device, coupled to bus 1802 for storing information and instructions to be executed by processor 1804. Main memory 1806 also may be used for storing temporary variables or other intermediate information during execution of instructions to be executed by processor 1804. Computer system 1800 further includes a read only memory (ROM) 1808 or other static storage device coupled to bus 1802 for storing static information and instructions for processor 1804. A storage device 1810, such as a magnetic disk or optical disk, is provided and coupled to bus 1802 for storing information and instructions.

Computer system 1800 may be coupled via bus 1802 to a display 1812, such as a cathode ray tube (CRT), for displaying information to a computer user. An input device 1814, including alphanumeric and other keys, is coupled to bus 1802 for communicating information and command selections to processor 1804. Another type of user input device is cursor control 1816, such as a mouse, a trackball, or cursor direction keys for communicating direction information and command selections to processor 1804 and for controlling cursor movement on display 1812. This input device typically has two degrees of freedom in two axes, a first axis (e.g., x) and a second axis (e.g., y), that allows the device to specify positions in a plane.

The invention is related to the use of computer system 1800 for implementing the techniques described herein. According to one embodiment of the invention, those techniques are performed by computer system 1800 in response to processor 1804 executing one or more sequences of one or more instructions contained in main memory 1806. Such instructions may be read into main memory 1806 from another machine-readable medium, such as storage device 1810. Execution of the sequences of instructions contained in main memory 1806 causes processor 1804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 1800, various machine-readable media are involved, for example, in providing instructions to processor 1804 for execution. Such a medium may take many forms, including but not limited to storage media. Storage media includes both non-volatile media and volatile media. Non-volatile media includes, for example, optical or magnetic disks, such as storage device 1810. Volatile media includes dynamic memory, such as main memory 1806. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other storage medium from which a computer can read.

Various forms of machine-readable media may be involved in carrying one or more sequences of one or more instructions to processor 1804 for execution. For example, the instructions may initially be carried on a magnetic disk of a remote computer. The remote computer can load the instructions into its dynamic memory and send the instructions over a telephone line using a modem. A modem local to computer system 1800 can receive the data on the telephone line and use an infra-red transmitter to convert the data to an infra-red signal. An infra-red detector can receive the data carried in the infra-red signal and appropriate circuitry can place the data on bus 1802. Bus 1802 carries the data to main memory 1806, from which processor 1804 retrieves and executes the instructions.

The instructions received by main memory 1806 may optionally be stored on storage device 1810 either before or after execution by processor 1804.

Computer system 1800 also includes a communication interface 1818 coupled to bus 1802. Communication interface 1818 provides a two-way data communication coupling to a network link 1820 that is connected to a local network 1822. For example, communication interface 1818 may be an integrated services digital network (ISDN) card or a modem to provide a data communication connection to a corresponding type of telephone line. As another example, communication interface 1818 may be a local area network (LAN) card to provide a data communication connection to a compatible LAN. Wireless links may also be implemented. In any such implementation, communication interface 1818 sends and receives electrical, electromagnetic or optical signals that carry digital data streams representing various types of information.

Network link 1820 typically provides data communication through one or more networks to other data devices. For example, network link 1820 may provide a connection through local network 1822 to a host computer 1824 or to data equipment operated by an Internet Service Provider (ISP) 1826. ISP 1826 in turn provides data communication services through the world wide packet data communication network now commonly referred to as the "Internet" 1828. Local network 1822 and Internet 1828 both use electrical, electromagnetic or optical signals that carry digital data streams.

Computer system 1800 can send messages and receive data, including program code, through the network(s), network link 1820 and communication interface 1818. In the Internet example, a server 1830 might transmit a requested code for an application program through Internet 1828, ISP 1826, local network 1822 and communication interface 1818.

The received code may be executed by processor 1804 as it is received, and/or stored in storage device 1810, or other non-volatile storage for later execution. In this manner, computer system 1800 may obtain application code in the form of a carrier wave.

4.0 Extension and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A data processing apparatus, comprising:
a policy administration point that is configured to receive one or more definitions or updates of entitlement policies specifying subjects, actions, and resources, and to update a first entitlement repository coupled to the policy administration point with the definitions or updates in response to receiving the definitions or updates;
one or more policy decision points that are coupled to the policy administration point over a network;
one or more policy enforcement points that are integrated into one or more respective first application programs, wherein each of the policy enforcement points is coupled to one of the policy decision points;
one or more action handlers in the policy administration point, wherein each of the action handlers is configured to intercept a particular action represented in an update to an entitlement policy, to transform the action into an entitlement update in a form compatible with a native entitlement mechanism of a second application program that does not have one of the policy enforcement points, to send the transformed entitlement update to the second application program, and to cause a rollback of the update of the first entitlement repository if the second application program fails to implement the entitlement update in the native entitlement mechanism.

2. The apparatus of claim 1, wherein the policy administration point is further configured to provide the action represented in an update to one or more of the policy decision points, and wherein each of the policy decision points is configured to perform policy resolution based on the action and to transform the action into enforcement data that the policy enforcement points can use to enforce the entitlement policy in the first application programs.

3. The apparatus of claim 2, wherein one of the policy decision points and an associated one of the policy enforcement points is configured within a server process of an application server of one of the first application programs.

4. The apparatus of claim 2, wherein one of the policy decision points is configured outside a server process of an application server of one of the first application programs and wherein an associated one of the policy enforcement points is configured within the server process.

5. The apparatus of claim 1, wherein a first one of the policy decision points and the policy administration point are coupled to the first entitlement repository, and wherein a second one of the policy decision points and the policy administration point are coupled to a second entitlement repository.

6. The apparatus of claim 1, wherein the action handlers are coupled using a messaging infrastructure to one of the policy decision points, and wherein that one of the policy decision points is coupled to a second entitlement repository.

7. The apparatus of claim 1, wherein one or more of the policy decision points comprises a PDP decision cache that stores policy resolution decisions, wherein the PDP decision cache is coupled to a PEP decision cache at one of the policy enforcement points.

8. The apparatus of claim 1, wherein one or more of the policy enforcement points comprises an administrative interface that is configured to issue one or more administrative calls to the policy administration point and a decision interface that is configured to issue one or more decision queries to an associated one of the policy decision points.

9. The apparatus of claim 1, wherein policy administration point is further configured to receive the one or more definitions or updates of entitlement policies in an XACML file received on a SOAP interface of the policy administration point.

10. A non-transitory computer-readable storage medium encoded with one or more sequences of instructions which when executed by one or more processors cause the one or more processors to perform:
receiving, at a policy administration point, one or more definitions or updates of entitlement policies specifying subjects, actions, and resources;

creating one or more policy decision points that are coupled to the policy administration point over a network;

creating one or more policy enforcement points that are integrated into one or more respective first application programs, wherein each of the policy enforcement points is coupled to one of the policy decision points;

in response to receiving the definitions or updates, updating a first entitlement repository coupled to the policy administration point with the definitions or updates;

determining a type of action represented in one of the received definitions or updates;

invoking one or more action handlers in the policy administration point, wherein each of the action handlers is configured to intercept a particular action represented in an update to an entitlement policy, to transform the action into an entitlement update in a form compatible with a native entitlement mechanism of a second application program that does not have one of the policy enforcement points, to send the transformed entitlement update to the second application program, and to cause a rollback of the update of the first entitlement repository if the second application program fails to implement the entitlement update in the native entitlement mechanism.

11. The non-transitory computer-readable storage medium of claim 10, further comprising instructions which when executed cause providing the action represented in an update to one or more of the policy decision points; performing, at each of the policy decision points, policy resolution based on the action; and transforming the action into enforcement data that the policy enforcement points can use to enforce the entitlement policy in the first application programs.

12. The non-transitory computer-readable storage medium of claim 11, further comprising instructions which when executed cause creating one of the policy decision points and an associated one of the policy enforcement points within a server process of an application server of one of the first application programs.

13. The non-transitory computer-readable storage medium of claim 11, further comprising instructions which when executed cause creating one of the policy decision points outside a server process of an application server of one of the first application programs and creating an associated one of the policy enforcement points within the server process.

14. The non-transitory computer-readable storage medium of claim 10, further comprising instructions which when executed cause creating a first one of the policy decision points and the policy administration point in a configuration coupled to the first entitlement repository, and creating a second one of the policy decision points and the policy administration point in a configuration coupled to a second entitlement repository.

15. The non-transitory computer-readable storage medium of claim 10, further comprising instructions which when executed cause coupling the action handlers using a messaging infrastructure to one of the policy decision points, and coupling one of the policy decision points to a second entitlement repository.

16. The non-transitory computer-readable storage medium of claim 10, further comprising instructions which when executed cause creating one or more of the policy decision points with a PDP decision cache that stores policy resolution decisions, and coupling the PDP decision cache to a PEP decision cache at one of the policy enforcement points.

17. The non-transitory computer-readable storage medium of claim 10, further comprising instructions which when executed cause creating in one or more of the policy enforcement points an administrative interface that is configured to issue one or more administrative calls to the policy administration point, and creating a decision interface that is configured to issue one or more decision queries to an associated one or the policy decision points.

18. The non-transitory computer-readable storage medium of claim 10, further comprising instructions which when executed cause configuring the policy administration point to receive the one or more definitions or updates of entitlement policies in an XACML file received on a SOAP interface of the policy administration point.

19. A computer-implemented method, comprising:

receiving, at a policy administration point, one or more definitions or updates of entitlement policies specifying subjects, actions, and resources;

creating one or more policy decision points that are coupled to the policy administration point over a network;

creating one or more policy enforcement points that are integrated into one or more respective first application programs, wherein each of the policy enforcement points is coupled to one of the policy decision points;

in response to receiving the definitions or updates, updating a first entitlement repository coupled to the policy administration point with the definitions or updates;

determining a type of action represented in one of the received definitions or updates;

invoking one or more action handlers in the policy administration point, wherein each of the action handlers is configured to intercept a particular action represented in an update to an entitlement policy, to transform the action into an entitlement update in a form compatible with a native entitlement mechanism of a second application program that does not have one of the policy enforcement points, to send the transformed entitlement update to the second application program, and to cause a rollback of the update of the first entitlement repository if the second application program fails to implement the entitlement update in the native entitlement mechanism.

20. The computer-implemented method of claim 19, further comprising providing the action represented in an update to one or more of the policy decision points; performing, at each of the policy decision points, policy resolution based on the action; and transforming the action into enforcement data that the policy enforcement points can use to enforce the entitlement policy in the first application programs.

21. The computer-implemented method of claim 20, further comprising creating one of the policy decision points and an associated one of the policy enforcement points within a server process of an application server of one of the first application programs.

22. The computer-implemented method of claim 20, further comprising creating one of the policy decision points outside a server process of an application server of one of the first application programs and creating an associated one of the policy enforcement points within the server process.

23. The computer-implemented method of claim 19, further comprising creating a first one of the policy decision points and the policy administration point in a configuration coupled to the first entitlement repository, and creating a second one of the policy decision points and the policy administration point in a configuration coupled to a second entitlement repository.

24. The computer-implemented method of claim 19, further comprising coupling the action handlers using a messaging infrastructure to one of the policy decision points, and coupling one of the policy decision points to a second entitlement repository.

25. The computer-implemented method of claim 19, further comprising creating one or more of the policy decision points with a PDP decision cache that stores policy resolution decisions, and coupling the PDP decision cache to a PEP decision cache at one of the policy enforcement points.

26. The computer-implemented method of claim 19, further comprising creating in one or more of the policy enforcement points an administrative interface that is configured to issue one or more administrative calls to the policy administration point, and creating a decision interface that is configured to issue one or more decision queries to an associated one or the policy decision points.

* * * * *